(12) United States Patent
Fan

(10) Patent No.: US 10,721,231 B2
(45) Date of Patent: Jul. 21, 2020

(54) WEBSITE LOGIN METHOD AND APPARATUS

(71) Applicant: Alibaba Group Holding Limited, George Town (KY)

(72) Inventor: Xiaofeng Fan, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/128,277

(22) Filed: Sep. 11, 2018

(65) Prior Publication Data

US 2018/0375863 A1 Dec. 27, 2018

Related U.S. Application Data

(63) Continuation of application No. PCT/CN2017/075459, filed on Mar. 2, 2017.

(30) Foreign Application Priority Data

Mar. 15, 2016 (CN) .......................... 2016 1 0147571

(51) Int. Cl.
*H04L 29/06* (2006.01)
*G06F 16/957* (2019.01)
(Continued)

(52) U.S. Cl.
CPC .......... *H04L 63/0876* (2013.01); *G06F 16/22* (2019.01); *G06F 16/957* (2019.01);
(Continued)

(58) Field of Classification Search
CPC . H04L 63/0876; H04L 63/0853; H04L 63/10; H04L 63/08
See application file for complete search history.

(56) References Cited

U.S. PATENT DOCUMENTS 7,137,006 B1 11/2006 Grandcolas et al.
8,490,168 B1 7/2013 Holloway et al.
(Continued)

FOREIGN PATENT DOCUMENTS

CN 102299802 12/2011
CN 102682009 9/2012
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Sher A Khan
(74) *Attorney, Agent, or Firm* — Fish & Richardson P.C.

(57) ABSTRACT

The present application provides example website login methods and apparatuses. One example method includes identifying a website jump trigger indication to jump from a first website to a second website. A first token is then obtained from a cookie store of the web browser, the first token associated with a website identifier of the second website and a device fingerprint indicating a running environment at a time when the password-free proxy login was previously set. In response to determining that a current running environment corresponds to the device fingerprint, a second token corresponding to the first token is obtained, wherein the second token comprises an access token indicating that the second website grants password-free login permissions. A password-free login request is sent to the second website including the second token. In response to the second website verifying the second token, the second website is logged into without a password.

18 Claims, 18 Drawing Sheets

(51) Int. Cl.
    *G06F 21/41*     (2013.01)
    *G06F 21/44*     (2013.01)
    *G06Q 20/40*     (2012.01)
    *G06Q 30/06*     (2012.01)
    *G06F 21/31*     (2013.01)
    *H04L 9/32*     (2006.01)
    *G06Q 20/12*     (2012.01)
    *G06F 16/22*     (2019.01)
    *G06F 21/62*     (2013.01)
    *H04L 29/08*     (2006.01)

(52) U.S. Cl.
    CPC .............. *G06F 21/31* (2013.01); *G06F 21/41* (2013.01); *G06F 21/44* (2013.01); *G06Q 20/12* (2013.01); *G06Q 20/40* (2013.01); *G06Q 30/0601* (2013.01); *G06Q 30/0609* (2013.01); *G06Q 30/0637* (2013.01); *H04L 9/3213* (2013.01); *H04L 63/0815* (2013.01); *H04L 63/0853* (2013.01); *G06F 21/6263* (2013.01); *H04L 63/0823* (2013.01); *H04L 67/02* (2013.01); *H04L 2209/76* (2013.01)

(56) References Cited

U.S. PATENT DOCUMENTS

| | | | | |
|---|---|---|---|---|
| 2002/0046281 | A1* | 4/2002 | Cope | G06F 11/3438 709/227 |
| 2002/0123904 | A1* | 9/2002 | Amengual | G06Q 30/0256 709/223 |
| 2006/0282660 | A1* | 12/2006 | Varghese | G06Q 20/341 713/155 |
| 2010/0211796 | A1 | 8/2010 | Galley et al. | |
| 2011/0276797 | A1* | 11/2011 | Pedlow | H04L 63/0807 713/151 |
| 2013/0139241 | A1 | 5/2013 | Leeder | |
| 2013/0238750 | A1* | 9/2013 | Fu | H04L 29/0809 709/217 |
| 2014/0325089 | A1* | 10/2014 | Lin | H04L 63/10 709/245 |
| 2015/0106905 | A1* | 4/2015 | Fang | H04L 63/0815 726/8 |
| 2015/0127943 | A1* | 5/2015 | Luo | H04L 63/0428 713/168 |
| 2015/0186542 | A1* | 7/2015 | Singh | G06F 16/9566 715/206 |
| 2015/0188909 | A1 | 7/2015 | Hyland et al. | |
| 2015/0237038 | A1 | 8/2015 | Grajek et al. | |
| 2015/0310194 | A1* | 10/2015 | Zhang | G06F 21/31 726/9 |
| 2019/0097996 | A1* | 3/2019 | Gong | H04L 63/0815 |

FOREIGN PATENT DOCUMENTS

| | | |
|---|---|---|
| CN | 103457738 | 12/2013 |
| CN | 103986720 | 8/2014 |
| CN | 104348612 | 2/2015 |
| CN | 104348777 | 2/2015 |
| CN | 104378376 | 2/2015 |
| CN | 105323222 | 2/2016 |
| CN | 105337990 | 2/2016 |
| JP | 2013518326 | 5/2013 |
| KR | 20130040032 | 4/2013 |
| KR | 20140081041 | 7/2014 |
| KR | 20140110118 | 9/2014 |
| KR | 20160013905 | 2/2016 |
| TW | 201616382 | 5/2016 |
| WO | WO 0239237 | 5/2002 |

OTHER PUBLICATIONS

Nakamoto, "Bitcoin: A Peer-to-Peer Electronic Cash System," www.bitcoin.org, 2005, 9 pages.

Extended European Search Report in European Application No. 17765719.4, dated Oct. 7, 2019, 9 pages.

International Search Report issued by the International Searching Authority in International Application No. PCT/CN2017/075459 dated May 24, 2017; 8 pages.

* cited by examiner

WEBSITE LOGIN METHOD AND APPARATUS

This application is a continuation of PCT Application No. PCT/CN2017/075459, filed on Mar. 2, 2017, which claims priority to Chinese Patent Application No. 201610147571.7, filed on Mar. 15, 2016, and each application is hereby incorporated by reference in its entirety.

TECHNICAL FIELD

The present application relates to the network technologies, and in particular, to a website login method and apparatus.

BACKGROUND

In typical Internet surfing scenario, a user first visits a website through a browser, and is redirected to another website from the website the user first visited to perform certain services. For example, when shopping online, the user visits a shopping website through the browser. The shopping website displays a list of merchandise to be selected for purchase. When the user is paying for a selected merchandise, the shopping website needs to jump to a payment website. In the existing technology, in such a procedure of cooperation among a plurality of websites, the login is needed for a website jump. In the previous example, when the shopping website is switched to the payment website, the login information such as a user name and a password for the payment website needs to be entered, which is a complex procedure. Even though the payment website can be logged in to by using no password, in other words, the payment website can be directly jumped to without entering the login information, this password-free login security relies solely on the payment website. Because not all payment websites have a relatively high self-protection capability, some websites cannot ensure password-free login security and there is a security risk.

SUMMARY

In view of this, the present application provides a website login method and apparatus to improve password-free login security in case of cooperation among a plurality of websites.

The present application is implemented by using the following technical solutions:

According to a first aspect, a website login method is provided, where the method is used for logging in to a second website through a first website through password-free proxy, and the method includes the following: when the first website receives a website jump trigger, obtaining a first token stored in cookies of a browser that the first website runs on, where the first token includes a website identifier of a second website on a second website list page indicated by the website jump trigger, and a device fingerprint used to indicate a running environment where password-free proxy login is set for the second website; if the first website determines, based on the device fingerprint, that a current running environment is the same as the running environment where password-free proxy login is set for the second website, obtaining, by the first website, a second token that corresponds to the first token, where the second token is an access token indicating that the second website grants password-free login permission after user login succeeds; and sending, by the first website based on the website identifier in the first token, a password-free login request including a third token to the second website that corresponds to the website identifier, where the third token includes the second token; and logging in to the second website without a password when the second website successfully verifies the second token.

According to a second aspect, a website login method is provided, where the method is used for password-free login of a second website through a first website, and the method includes: displaying, by the first website, a website jump trigger identifier on a page, where the website jump trigger identifier is used to, when selected, trigger the first website to jump to a website list page including a plurality of second websites to be selected; and in response to user selection of the website jump trigger identifier, jumping, by the first website, to a logged-in page that displays one of the plurality of second websites on the website list page.

According to a third aspect, a website login method is provided, where the method is used for password-free login of a second website through a first website, and the method includes: receiving, by the second website, a password-free login request sent by the first website, where the password-free login request includes a third token, the third token includes a second token, and the second token is an access token indicating that the second website grants password-free login permission after user login succeeds; and when the second website successfully verifies the second token, performing password-free login.

According to a fourth aspect, a website login apparatus is provided, where the apparatus is applied to a first website, so as to log in to a second website through the first website through password-free proxy, and the apparatus includes the following: a token acquisition module, configured to obtain a first token stored in cookies of a browser that the first website runs on, when a website jump trigger is received, where the first token includes a website identifier of a second website on a second website list page indicated by the website jump trigger, and a device fingerprint used to indicate a running environment where password-free proxy login is set for the second website; a token verification module, configured to obtain a second token that corresponds to the first token, if it is determined based on the device fingerprint that a current running environment is the same as the running environment where password-free proxy login is set for the second website where the second token is an access token indicating that the second website grants password-free login permission after user login succeeds; and a password-free login module, configured to send, based on the website identifier in the first token, a password-free login request including a third token to the second website that corresponds to the website identifier, where the third token includes the second token; and log in to the second website without a password when the second website successfully verifies the second token.

According to a fifth aspect, a website login apparatus is provided, where the apparatus is applied to a first website, so as to log in to a second website through the first website through password-free proxy, and the apparatus includes an identifier display module, configured to display a website jump trigger identifier on a page, where the identifier is used to, when selected, trigger the first website to jump to a website list page including a plurality of second websites to be selected; and a page jump module, configured to jump to a logged-in page that displays one of the plurality of second websites on the website list page, in response to user selection of the website jump trigger identifier.

According to a sixth aspect, a website login apparatus is provided, where the apparatus is applied to a second website, so as to log in to the second website through a first website through password-free proxy, and the apparatus includes the following: a request receiving module, configured to receive a password-free login request sent by the first website, where the password-free login request includes a third token, the third token includes a second token, and the second token is an access token indicating that the second website grants password-free login permission after user login succeeds; and a login execution module, configured to perform password-free login when verification of the second token succeeds.

According to the website login method and apparatus provided in the present application, both the first website and the second website perform security verification during password-free proxy login, so that security of password-free login of the second website through the first website is improved.

DESCRIPTION OF IMPLEMENTATIONS

Figure 1:
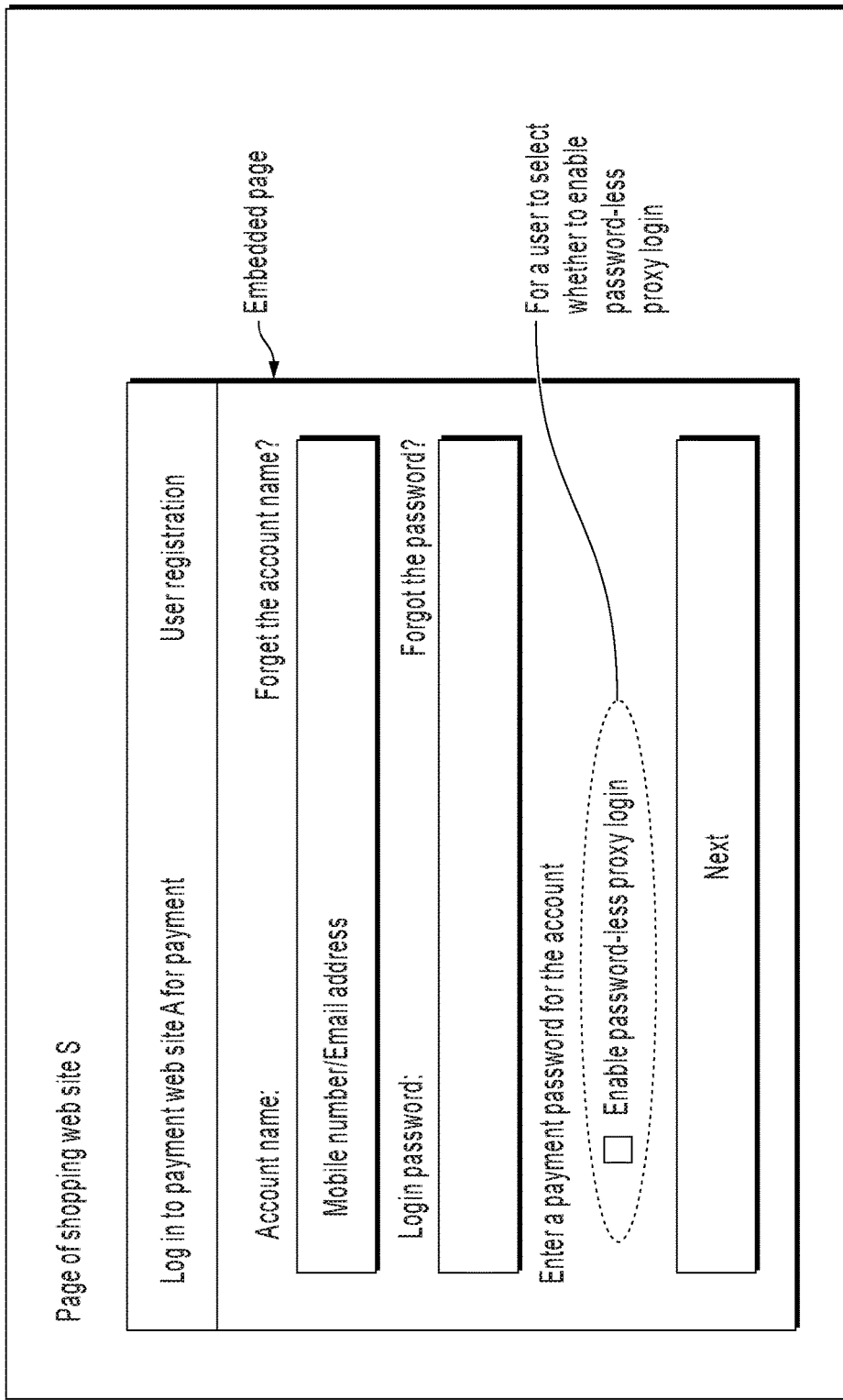
FIG. 1 is a schematic diagram illustrating a payment website login page, according to an example implementation of the present application.

Example implementations are described in detail here, and examples of the example implementations are presented in the accompanying drawings. When the following description relates to the accompanying drawings, unless specified otherwise, same numbers in different accompanying drawings represent a same or similar element. Implementations described in the following example implementations do not represent all implementations consistent with the present application. On the contrary, they are only examples of apparatuses and methods that are described in the appended claims in detail and that are consistent with some aspects of the present application.

There are procedures of cooperation between websites in many network applications. Through cooperation between websites, a user first performs an operation on one website, and then the website needs to jump to another website before one application is complete. A common scenario is online shopping. For example, the user visits a shopping website through a browser. The shopping website displays a list of merchandise to be selected for purchase. When the user is paying for a selected merchandise, the shopping website needs to jump to a payment website. To be specific, the user's current online shopping requires cooperation between the shopping website and the payment website and a jump between the two websites.

To facilitate the user's application experience, some websites can provide password-free login. Password-free login allows the user to directly log in to the user's account on a website without entering a user name or a password. For example, for online shopping, password-free login can be set for the payment website. When the shopping website is jumping to the payment website, the user directly logs in to the payment website without the need of entering the user name or the password. However, password-free login may be unsafe. There are certain security risks if security of password-free login relies solely on the payment website.

To improve security, the present application provides a website login method. The method can be applied to jump login between websites. For example, when the shopping website is jumping to the payment website, the user can log in to the payment website by using the method of the present application. Certainly, the method of the present application is not limited to the shopping scenario. The method can be used for other similar procedures performed through cooperation between websites.

In the following description of the website login method of the present application, a concept word "password-free proxy login" is used. Use of the word intends to indicate that password-free login of a jumped-to website, for example, the payment website, is also needed in the website login method of the present application. However, a difference between password-free proxy login and common password-free login lies in that, during password-free proxy login, both websites related to a jump between the websites perform security-related verification. For example, in a shopping scenario, the shopping website jumps to the payment website, and both the shopping website and the payment website need to perform security verification before the payment website can be finally logged in to without a password, which is a dual authentication method. In addition, due to password-free proxy login, the shopping website can automatically jump to one payment website (a plurality of payment websites can be linked to the shopping website) for login, and the user does not need to select a specific payment website for password-free login. In other words, the shopping website knows which payment website needs to be selected for password-free login.

The website login method in the present application is described below by using an application example of the shopping website (a first website) and the payment website (a second website). The website login method in the present application describes a password-free proxy login setting process and a password-free proxy login execution process after the setting is complete. All these processes require cooperation between the shopping website and the payment website.

Assume that the user goes shopping on a shopping website. After adding a selected merchandise to a cart, the user can press a "Checkout" button for checkout and payment. The checkout button can be referred to as a website jump trigger identifier. The website jump trigger identifier can be used to trigger, when the identifier is selected by the user, the shopping website to jump to a website list page including a plurality of payment websites to be selected. For example, the website list page can display payment website A, payment website B, payment website C, etc., and the user can select a specific payment method.

Assume that the user selects one of the previous payment methods. In this implementation of the present application, after receiving user selection of the website jump trigger, the shopping website can display a login page of a payment website selected by the user in an embedded page form. It is worthwhile to note that password-free proxy login has not been set at this time. The shopping website still needs to display the website list page described above when the user presses the checkout button. In addition, after the user selects a payment website, a login page of the payment website is displayed, so that the user can enter a user name and a password. For a page display example, references can be made to FIG. 1.

As shown in FIG. 1, a login page of payment website A selected by the user can be displayed on a page of the shopping website in an embedded page form, or displayed on a separate page without using the embedded page. In the following implementations of the present application, for example, pages related to a website jump are all displayed in an embedded page form. Displaying in an embedded page form can help the user switch to another payment website at any time. For example, when the login page of payment website A is displayed on the page of the shopping website in an embedded page form, a selection identifier of payment website B, a selection identifier of payment website C, etc., as well as the embedded page, are all displayed on the page of the shopping website. If the user does not want to log in to payment website A, it is convenient for the user to select another website such as payment website B.

Login of payment website A is still used as an example. In specific implementation, the page of the shopping website can include an embedded iframe that points to the login page of payment website A, and a uniform resource locator (URL) includes a parameter "container=S" (S represents the shopping website), which indicates that the login page of payment website A is embedded in the container S. The login page of payment website A is loaded by payment website A, transmitted by a server to a payment website client in a browser that S runs on, and displayed on the payment website client.

It is worthwhile to note that, still referring to FIG. 1, the login page of payment website A further displays an option "Enable password-free proxy login", so that the user can choose whether to enable password-free proxy login. If the user selects the option, it indicates that the user wants the shopping website to automatically jump to a logged-in page of a payment website after the user presses the checkout button on the shopping website. For the logged-in page, references can be made to FIG. 2. In comparison with previous user operations, the user no longer needs to select payment website A from the website list page or enter the user name or the password in FIG. 1, but directly visits a page displayed after payment website A is successfully logged in to for payment confirmation. If the user does not select the option, it indicates that the user does not want to simplify the previous procedure.

If the user selects and presses the option "Enable password-free proxy login" shown in FIG. 1, and presses "Next", payment website A will receive login information (for example, the user name and the password entered by the user on the login page in FIG. 1) and a password-free login setting request indication (when the user selects the option, it indicates that the user sends the indication to payment website A).

Figure 3:
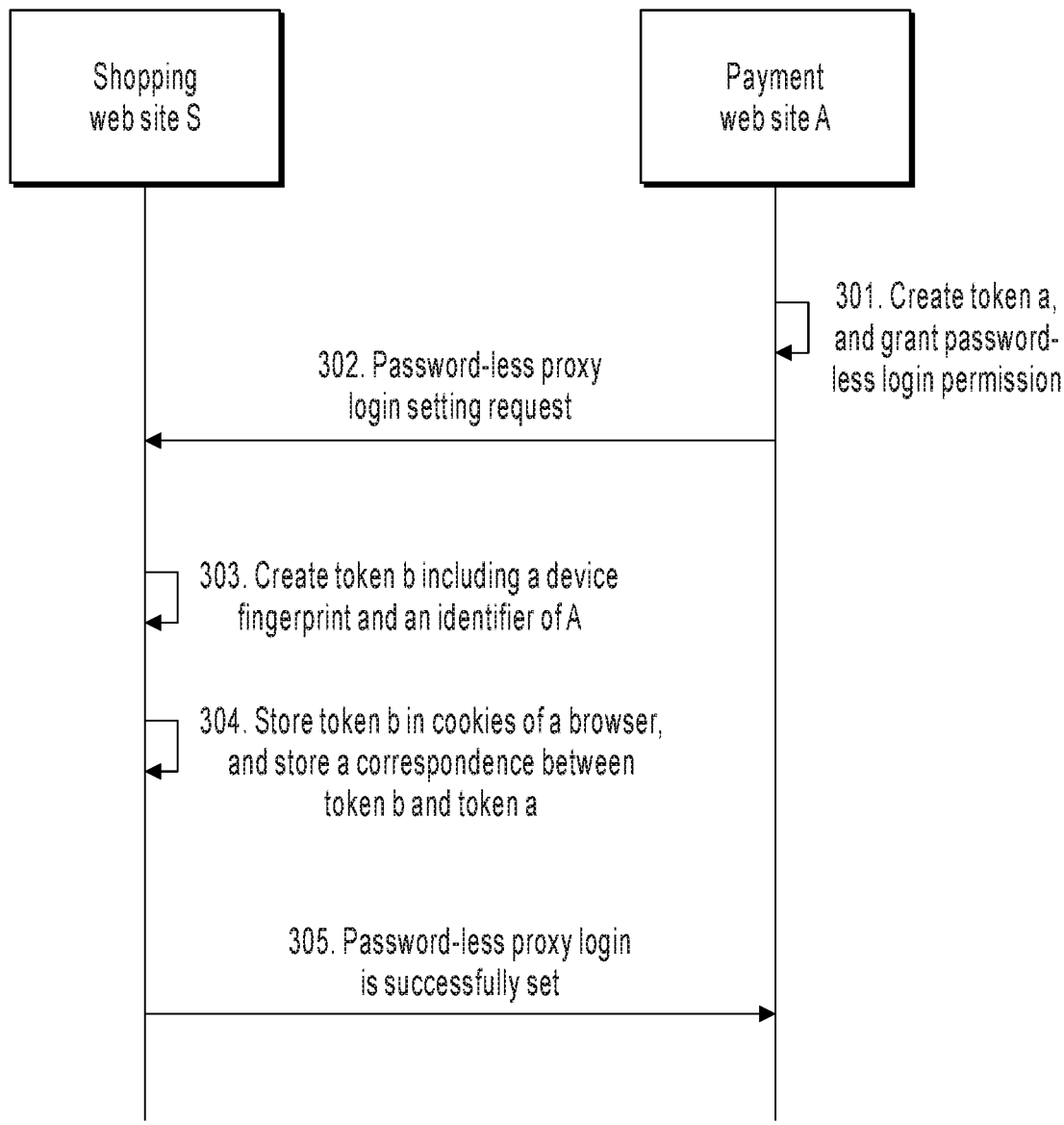
FIG. 3 is a procedure for setting password-free proxy login, according to an example implementation of the present application.

If payment website A successfully verifies the login information and learns that the user expects to enable password-free proxy login in a login process following the current login, payment website A will start a password-free proxy login setting procedure. The setting procedure can be implemented interactively between payment website A and shopping website S. Payment website A needs to send a password-free proxy login setting request to the shopping website, to request the shopping website to perform setting that is related to password-free proxy login. After the setting succeeds, the shopping website notifies payment website A that password-free proxy login is successfully set. FIG. 3 shows a password-free proxy login setting procedure.

In step 301, payment website A creates token a, and token a is used to represent an access token indicating that password-free login permission is granted.

For example, token a can be referred to as a second token (the second token is used only to distinguish from a first token, a third token, etc. in subsequent implementations). Token a is created by payment website A after successfully verifying the user name and the password entered by the user in FIG. 1.

Token a can include three types of information: a website identifier (which can be a website name) signed by payment website A by using a private key of the website, a current time signed by using the private key of the website, and the user name in the login information. The user name is separately encrypted by using a public key of payment website A, and signed by using the private key of the website.

The three types of information in token a have the following respective functions: When payment website A sends a password-free proxy login setting request to shopping website S in subsequent steps, the request can include token a, and the website identifier signed by using the private key can be used to assure shopping website S of authenticity of the setting request. The current time signed by using the private key can be used to indicate that tokens created at different times change with time, so as to avoid repetition and theft. The encrypted and signed user name is mainly used to be transferred by S to A when password-free proxy login is triggered in subsequent implementations, so as to specify a user that performs password-free login.

In addition, the token in this implementation of the present application not only is encrypted by using the encryption key, but also includes an encryption key fingerprint. When a corresponding website updates an encryption key certificate and a new encryption key and an old encryption key simultaneously exist, the encryption key fingerprint in the token can be used to identify a corresponding encryption key, so as to complete decryption or signature verification. Other tokens in the following implementations also include corresponding encryption key fingerprints. Details are omitted here.

In step 302, payment website A sends a password-free proxy login setting request including token a to shopping website S.

In this implementation, interactive communication between payment website A and shopping website S can be implemented by using a hidden embedded page, and communicated information is added to an URL of the hidden embedded page. For example, in this step, payment website A can send the password-free proxy login setting request to shopping website S by using an embedded iframe (hidden) that points to a password-free proxy login setting page of S, and an URL includes a parameter "token=token a". As such, S can receive the setting request and token a sent by A.

In step 303, shopping website S creates token b, where token b includes a device fingerprint and a website identifier of payment website A.

For example, shopping website S first verifies authenticity of this password-free proxy login setting request. S can use the public key of payment website A to check authenticity of the website name of payment website A included in token a. When shopping website S determines that the request is indeed sent by payment website A, shopping website S creates token b in this step. Token b can be referred to as a first token.

Token b can include three types of information. A first type of information is a device fingerprint. The device fingerprint mainly serves as an identifier indicating a running environment where current password-free proxy login is set. The running environment can include, for example, a current computer and a browser that the shopping website and the payment website run on. In specific implementation, for example, client code, such as JavaScript or Flash used in the browser, can be used to actively collect browser platform information, for example, a browser language. Server code, for example, Java or Python, can be used to actively collect field information such as operating system code in network protocols of various layers such as HTTP and TCP/IP. A device fingerprint can be used to uniquely identify a client computer (including a browser) after data combination. The fingerprint is encrypted by using the public key of S. A second type of information is the website identifier (e.g. the website name) of payment website A encrypted by using the public key of S. A third type of information is the current time encrypted by using the public key of S.

The three types of information in token b have the following respective functions: The device fingerprint can be used by shopping website S for security verification when password-free proxy login is subsequently triggered, so as to check whether the computer and the browser of the user are the same as those when password-free proxy login is set. The current time signed by S can be used by an internal policy of S to determine whether the token expires. For example, if the token exceeds a predetermined time length (e.g. three months), password-free proxy login is invalid. The website name of payment website A can enable S to accordingly learn that token b is specific to A, and that A has enabled password-free proxy login.

In step 304, shopping website S stores token b in cookies of a browser, and can store a correspondence between token b and token a in a backend database of the website.

In step 305, shopping website S notifies payment website A that password-free proxy login is successfully set.

For example, after shopping website S stores token b and the correspondence between the two tokens, password-free proxy login is successfully set. Because token b has been stored in the cookies of the browser, shopping website S can jump to a page indicating that password-free proxy login is successfully set, and notify payment website A that the setting succeeds.

Figure 2:
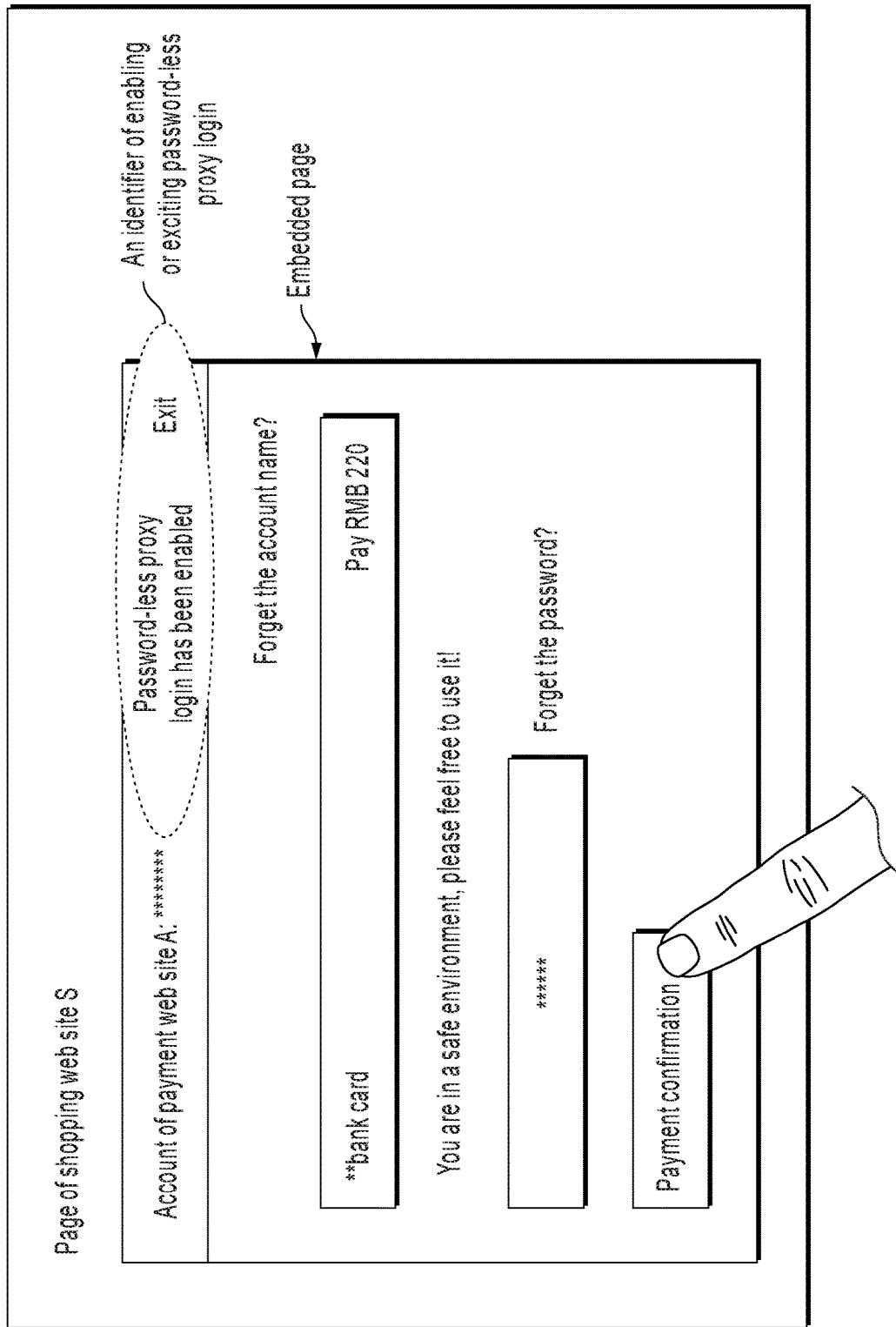
FIG. 2 is a schematic diagram illustrating a logged-in page, according to an example implementation of the present application.

Payment website A can use an inner iframe to load the page indicating that password-free proxy login is successfully set, and modify a parent iframe to display that password-free proxy login has been enabled. As shown in FIG. 2, a logged-in page of payment website A displays words that password-free proxy login has been enabled. After the user presses "Payment Confirmation" on the page shown in FIG. 2, a payment success page prompt can be displayed.

The previous procedure shown in FIG. 3 describes an interaction procedure between shopping website S and payment website A when password-free proxy login is set. It can be seen that, in the procedure, shopping website S creates token b for S to perform security verification, and token b includes the device fingerprint. In addition, payment website A creates token a for password-free login, and token a includes a specified user name for password-free login.

It can be further seen from FIG. 2 that the logged-in page of payment website A can include not only the words that password-free proxy login has been enabled but also an option that can be selected by the user for exiting password-free proxy login, for example, an option "Exit" next to "Password-free proxy login has been enabled" on the page.

When the user presses "Exit", it indicates that the user no longer wants to use password-free proxy login. To be specific, the user does not want shopping website S to directly jump to the logged-in page shown in FIG. 2 when pressing "Checkout" on shopping website S. At this time, payment website A receives a trigger to the option of exiting password-free proxy login. In this case, payment website A starts a password-free proxy login cancellation procedure. The cancellation procedure can be implemented interactively between payment website A and shopping website S. Payment website A needs to send a password-free proxy login cancellation request to shopping website S, to request the shopping website to perform a password-free proxy login cancellation operation. After the cancellation succeeds, the shopping website can choose to notify payment website A that password-free proxy login is successfully canceled.

Figure 4:
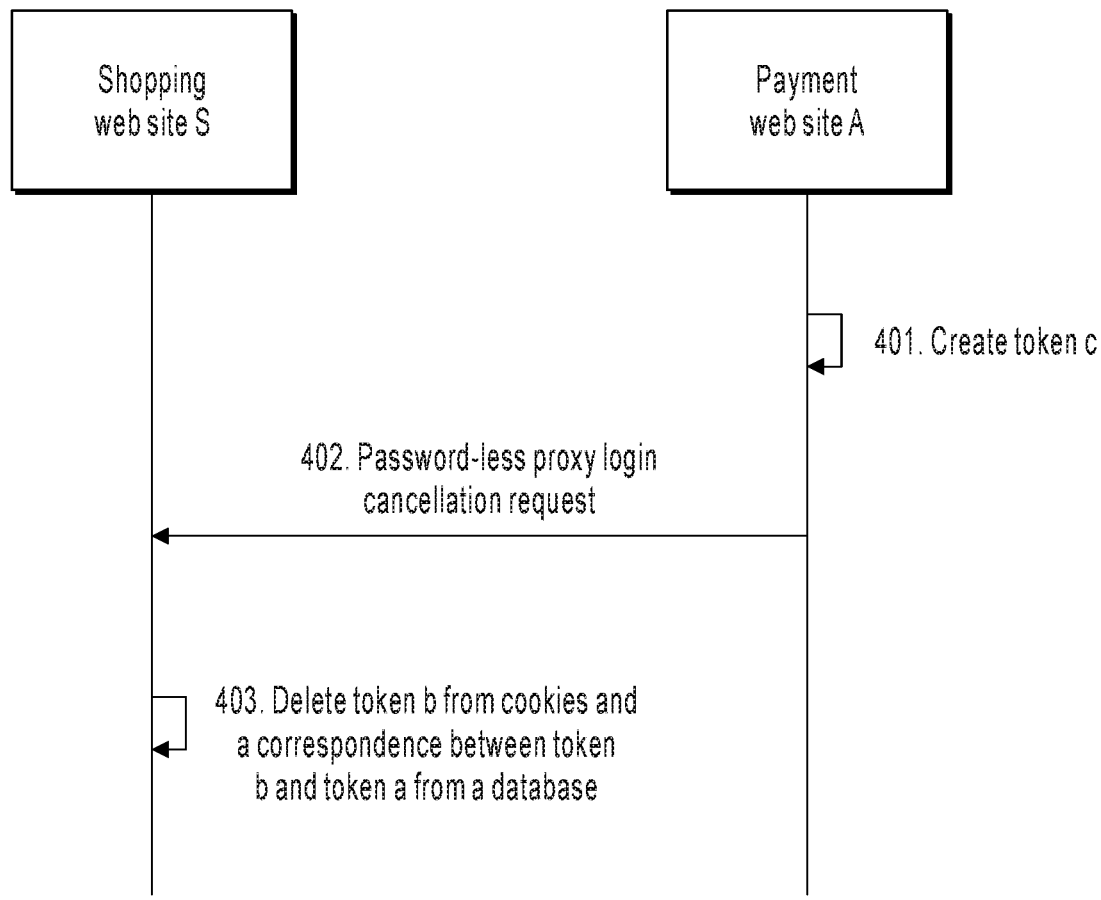
FIG. 4 is a procedure for canceling password-free proxy login, according to an example implementation of the present application.

FIG. 4 shows a password-free proxy login cancellation procedure. It is worthwhile to note that, when password-free proxy login is canceled, an automatic jump to a payment website from a shopping website can be canceled. However, password-free login of the payment website can remain. For example, in one feasible scenario, after the password-free proxy login is canceled, when a user presses a checkout button on shopping website S, a website list page including a plurality of payment websites is still displayed. For example, the website list page includes payment website A, payment website B, etc. The user can select and press payment website A for checkout. After selecting payment website A, the user can still log in to A without a password, to be specific, the user can directly visit a logged-in page of A without the need of entering a user name and a password. Alternatively, after selecting payment website A, the user enters a user name and a password and then visits a logged-in page. In other words, cancellation of password-free proxy login can mean cancellation of automatic selection of and a jump to payment website A from shopping website S.

In step 401, payment website A creates token c, where token c is used to instruct shopping website S to cancel password-free proxy login of payment website A.

For example, token c can be referred to as a fourth token. Token c can include a website identifier of payment website A, a current time, and an operation identifier "delete" used to instruct a deletion operation. The token can be encrypted and signed by payment website A.

In step 402, payment website A sends a password-free proxy login cancellation request including token c to shopping website S.

In step 403, shopping website S obtains token b including a website identifier of payment website A based on token c, and deletes token b and token a that corresponds to token b.

For example, shopping website S can identify, based on the website identifier of payment website A included in token c, token b including the website identifier in cookies of a browser, delete token b, and delete the corresponding token b and token a from a backend database. When the user subsequently wants shopping website S to jump to the payment website by pressing the checkout button on shopping website S again, S cannot identify token b in the cookies of the browser because token b and token a has been deleted. Consequently, shopping website S cannot learn of payment website A, and no longer automatically requests password-free login from payment website A. Shopping website S can display only the website list page, and the user selects and presses payment website A to request a jump.

Figure 5:
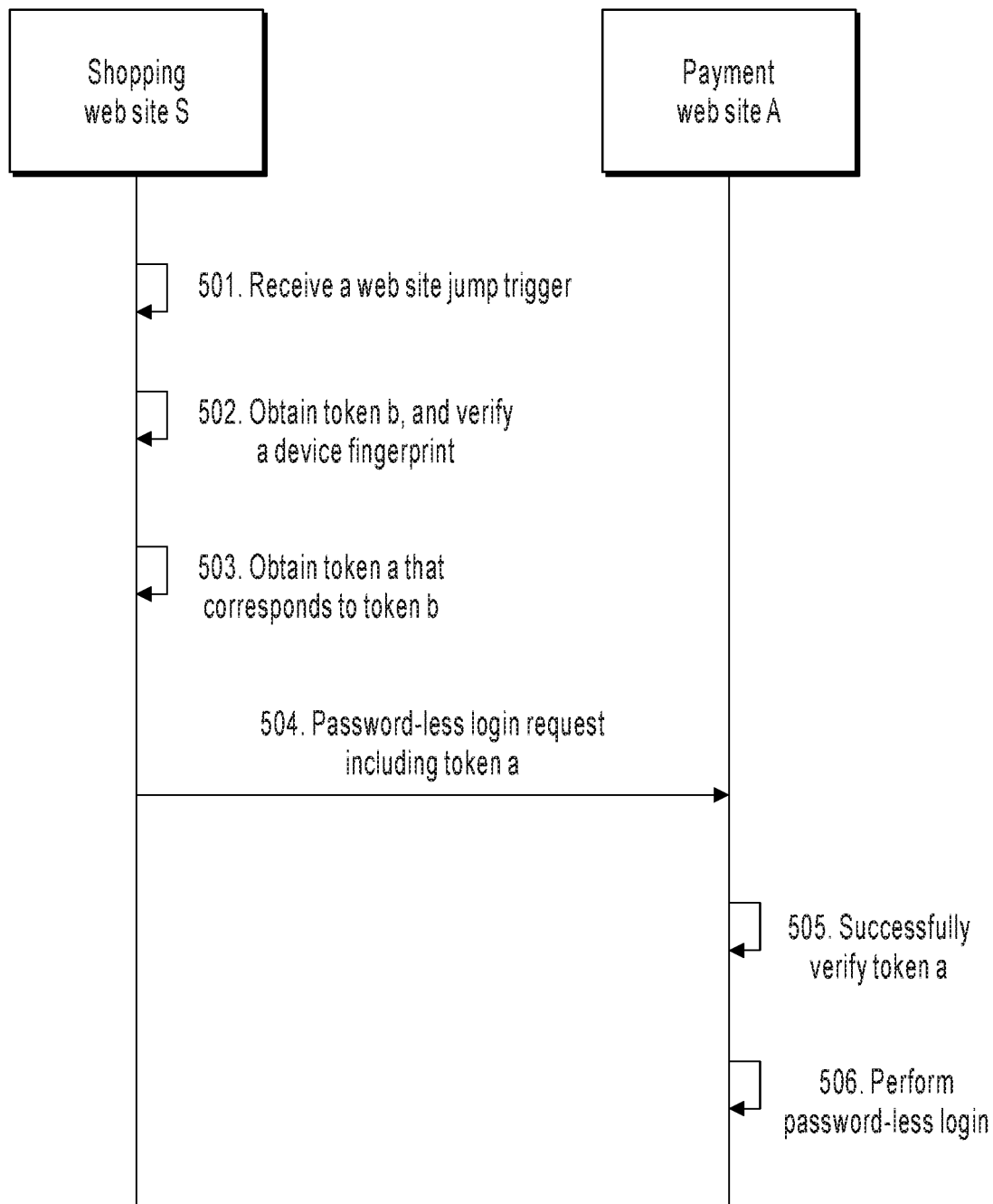
FIG. 5 is a procedure for applying password-free proxy login, according to an example implementation of the present application.

The password-free proxy login setting procedure and the password-free proxy login cancellation procedure are described above with reference to FIG. 3 and FIG. 4. Referring to FIG. 5, a password-free proxy login execution procedure is described below when a user presses a checkout button after password-free proxy login is set. Online shopping is still used as an example for description.

In step 501, shopping website S receives a website jump trigger.

In this step, after selecting a merchandise to be purchased on shopping website S, the user can press a checkout button on S. S receives a website jump trigger at this moment, in other words, S requests to jump to a payment website for payment. Generally, after the checkout button is pressed, a website list page including a plurality of payment websites to be selected is displayed (if the payment website is referred to as a second website, the website list page can be referred to as a second website list page). However, in the method in this implementation, after the user presses the checkout button, the website list page is no longer displayed, and shopping website S directly jumps to a logged-in page that displays one of the plurality of payment websites on the website list page. For example, after the user presses the checkout button, a logged-in page of payment website A in the plurality of payment websites is directly displayed, as shown in FIG. 2. For a specific implementation process, references can be made to the following subsequent steps in FIG. 5.

In step 502, shopping website S obtains token b stored in cookies of a browser that shopping website S runs on, to perform device fingerprint verification.

For example, token b stored in the cookies of the browser includes a website name of payment website A, and a device fingerprint of a running environment where logging in to A through S through password-free proxy is set.

In this step, shopping website S determines, based on the device fingerprint in token b, whether a current running environment is the same as the running environment indicated by the device fingerprint, for example, whether the same computer and browser are used. If verification of the device fingerprint succeeds, continue to perform step 503; otherwise, it indicates that there may be a security risk in current password-free proxy login, and the shopping website can stop performing subsequent steps, and notify the user of the risk. In addition, in this step, because token b further includes the website name of payment website A, shopping website S can learn, based on the website name, that A has enabled password-free proxy login.

In step 503, shopping website S obtains token a that corresponds to token b.

For example, token a can be an access token indicating that payment website A grants password-free login permission after user login succeeds. S can obtain token a that corresponds to token b from a backend database.

In step 504, shopping website S sends a password-free login request including token a to payment website A based on a website identifier in token b.

For example, in specific implementation, shopping website S can still transfer information by using an URL of a hidden embedded iframe. The embedded iframe points to a login page of payment website A, and the URL includes parameters "container=S" and "token=token d". Token d can be referred to as a third token. The third token can include at least the second token, in other words, token a signed by S, so that A can perform verification. In addition, after decrypting token a, A can obtain a user name in token a, so as to perform password-free login for a specified user. Further, the third token can include the S's name signed by S, so as to assure payment website A of authenticity of the request, and the third token can further include a current time signed by S by using a private key.

In step 505, payment website A successfully verifies token a.

For example, payment website A verifies token d to ensure authenticity of the request sent by shopping website S, and further verifies authenticity and completeness of token a. If verifications all succeeds, perform step 506, and log in to payment website A without a password. In this case, the logged-in page shown in FIG. 2 can be jumped to, and an identifier indicating that password-free proxy login has been enabled can be displayed on the page.

In step 506, log in to payment website A without a password.

The password-free proxy login setting procedure, the password-free proxy login cancellation procedure, and the password-free proxy login trigger and execution procedure are separately described with reference to FIG. 3 to FIG. 5. It can be seen from these procedures that shopping website S can learn that payment website A has enabled password-free proxy login, and can actively request password-free login from A. Shopping website S can directly jump to the logged-in page of A without the need of selecting A from a list including a plurality of payment websites by the user, so that a shopping speed is increased, and operation efficiency is improved. In addition, in these procedures, both S and A perform security verification. S verifies the device fingerprint, and A verifies the access token, so that security of password-free login of A is improved.

In addition, the token in this implementation of the present application can be a token designed based on the OAuth protocol, and encrypted and signed by using asymmetrical website encryption keys, so as to ensure confidentiality, authenticity, and completeness. Verification performed by S is bound to a computer (and browser software) specified by the user, and cannot be forged, duplicated, or denied. A token of S cannot be forged because of protection of the asymmetrical keys. Therefore, it can be ensured by using the HTTPS protocol that all underlying communication in the browser cannot be monitored or stolen in plaintext on the network. S and A have agreed on and constructed a password-free proxy login function. In addition, services, asymmetrical keys, and databases of S and A are safely run, safely stored, and not allowed to be secretly read or tampered with. When password-free proxy login is triggered, because S verifies whether the device fingerprint in token b is the same as that of a current computer (including a browser), no one can successfully implement login by using another remote computer instead. In addition, as long as A stores token d, S cannot deny that S creates the password-free login request.

The password-free proxy login execution procedure between shopping website S and one payment website A is described above as an example. In actual implementation, password-free proxy login can be set between shopping website S and a plurality of payment websites. For example, through password-free proxy, shopping website S can log in to payment website A, payment website B, and payment website C. Password-free proxy login relationships between all payment websites and S can be set in the same method. From the perspective of shopping website S, S can store a plurality of tokens b in the cookies of the browser. Each token b corresponds to a different payment website. The backend database stores all tokens b and corresponding tokens a. Token a is a password-free login access token created by a corresponding payment website.

In this case, when the user triggers password-free proxy login, for example, presses the checkout button on shopping website S, S can select, based on a predetermined selection rule, a payment website that has enabled password-free proxy login, to perform password-free proxy login. The selection rule can be, for example, selecting a latest logged-in payment website, or a most frequently logged-in website.

Figure 6:
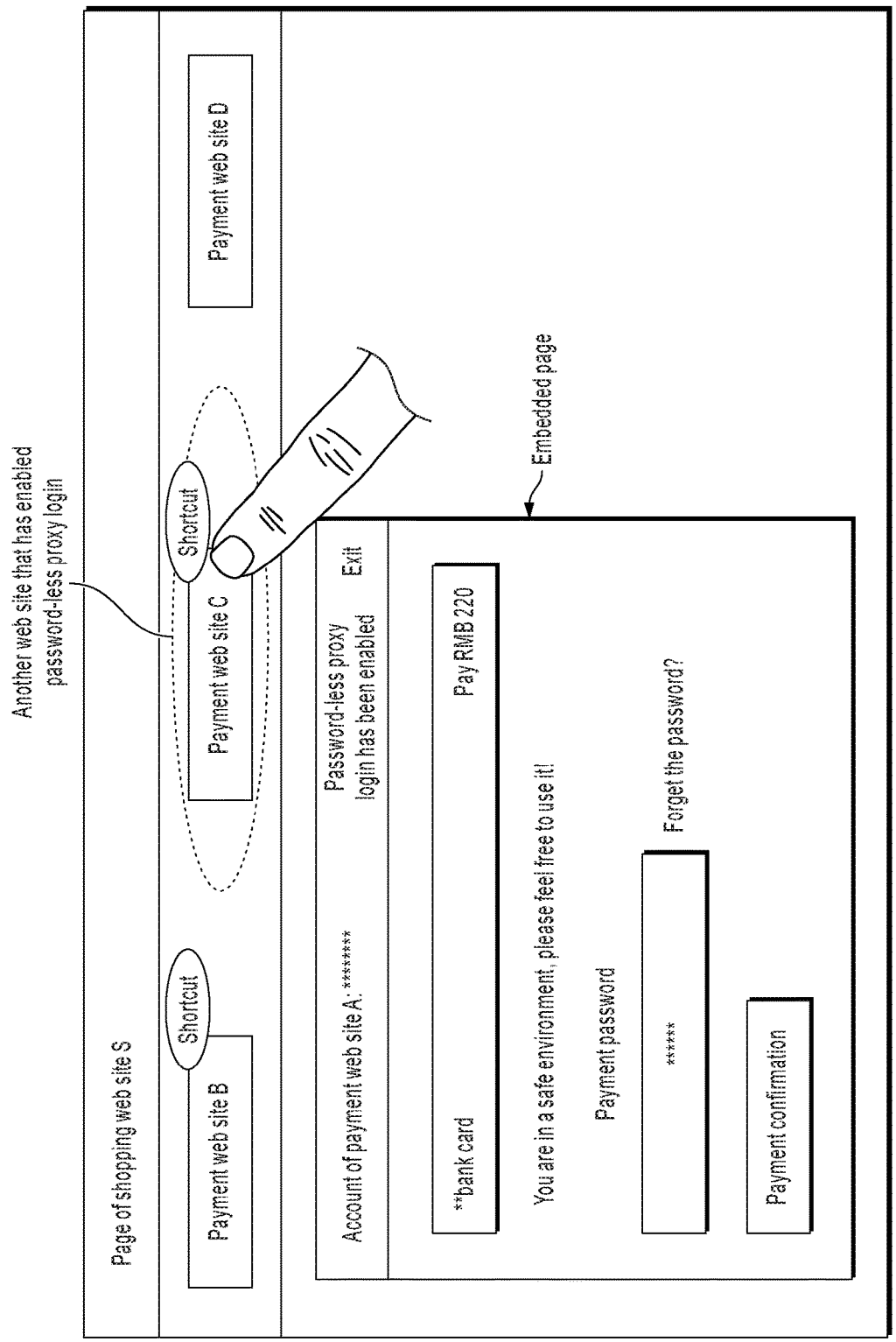
FIG. 6 is a schematic diagram illustrating display of a plurality of websites, according to an example implementation of the present application.

Referring to an example in FIG. 6, assume that password-free proxy login is enabled between S and three payment websites A, B, and C, and further assume that S selects A for default password-free proxy login. When a user presses a checkout button on S, S automatically jumps to a logged-in page of A. An embedded page in FIG. 6 displays the logged-in page of A. In addition, when checking a plurality of tokens b in cookies of a browser, S learns, based on website identifiers included in all tokens b, that payment websites B and C have also enabled password-free proxy login. Therefore, payment websites B and C can be simultaneously displayed on the same page as the embedded page, to facilitate switch and selection of the user. For example, by default, payment website A is logged in to through S through password-free proxy. However, the user actually wants to log in to B. The user can press payment website B on the page as a trigger, to log in to B instead through S through password-free proxy. In addition, as shown in FIG. 6, the payment websites B and C can further display identifiers indicating that password-free proxy login has been enabled. For example, "shortcut" is used to indicate that password-free proxy login has been enabled. Payment website D on the page does not display "shortcut", and it indicates that password-free proxy login is not set for payment website D.

Referring to FIG. 6, if the user selects payment website C, S will create a third token for requesting password-free login from payment website C. The third token includes the S's name signed by S, token a that corresponds to website C, and a current time. S sends a password-free login request including the third token to payment website C. After verification performed by C succeeds, S is switched to a logged-in page of payment website C in a location of the embedded page.

In the implementation shown in FIG. 6, S can select a login method if a plurality of websites have enabled password-free proxy login, facilitating the user's switch and selection.

The previous example describes password-free proxy login between shopping website S and the payment website. Shopping website S can directly jump to the payment website. For example, shopping website S provides a website list page. As long as the user selects payment website A, the user can log in to payment website A for payment. However, in another application scenario, an "intermediate site" is further needed between shopping website S and the payment website. Shopping website S cannot directly jump to the payment website. In this scenario, a first website can be the intermediate site or can be referred to as a payment website, and the second website can be another payment website linked to the payment website.

For example, if the method in the present application is not performed, when the user presses the checkout button on shopping website S, a website list page can be usually displayed. The page can include payment website A, payment website B, payment website C, and payment website N that serves as an intermediate site. If the user presses payment website N, a plurality of payment websites N1, N2, and N3 are further provided for user selection (these payment websites are equivalent to the payment websites A, B, and C). In other words, payment websites N1, N2, and N3 are next-layer sites of payment website N after accessed. If the user wants to use payment website N1, after pressing "Checkout" on S, the user needs to select payment website N, and then select payment website N1 on the page of N, which is a complex process.

Assume that password-free proxy login is set between payment website N and payment website N1 by using the method in the present application, and the procedure in FIG. 3 to FIG. 5 is performed. Payment website N is equivalent to shopping website S in the procedure, and payment website N1 is equivalent to payment website A in the procedure. After selecting and pressing payment website N, the user does not need to select N1, and payment website N can directly jump to a logged-in page that displays payment website N1. It is equivalent to jumping to the logged-in page that displays payment website A from shopping website S.

A password-free proxy login setting process and a password-free proxy login trigger process between N and N1 are described below in an S-N-N1 scenario. Because processing between N and N1 is the same as processing between S and A in FIG. 3 to FIG. 5, brief description is provided here. For details, references can be made to the previous example.

Figure 7:
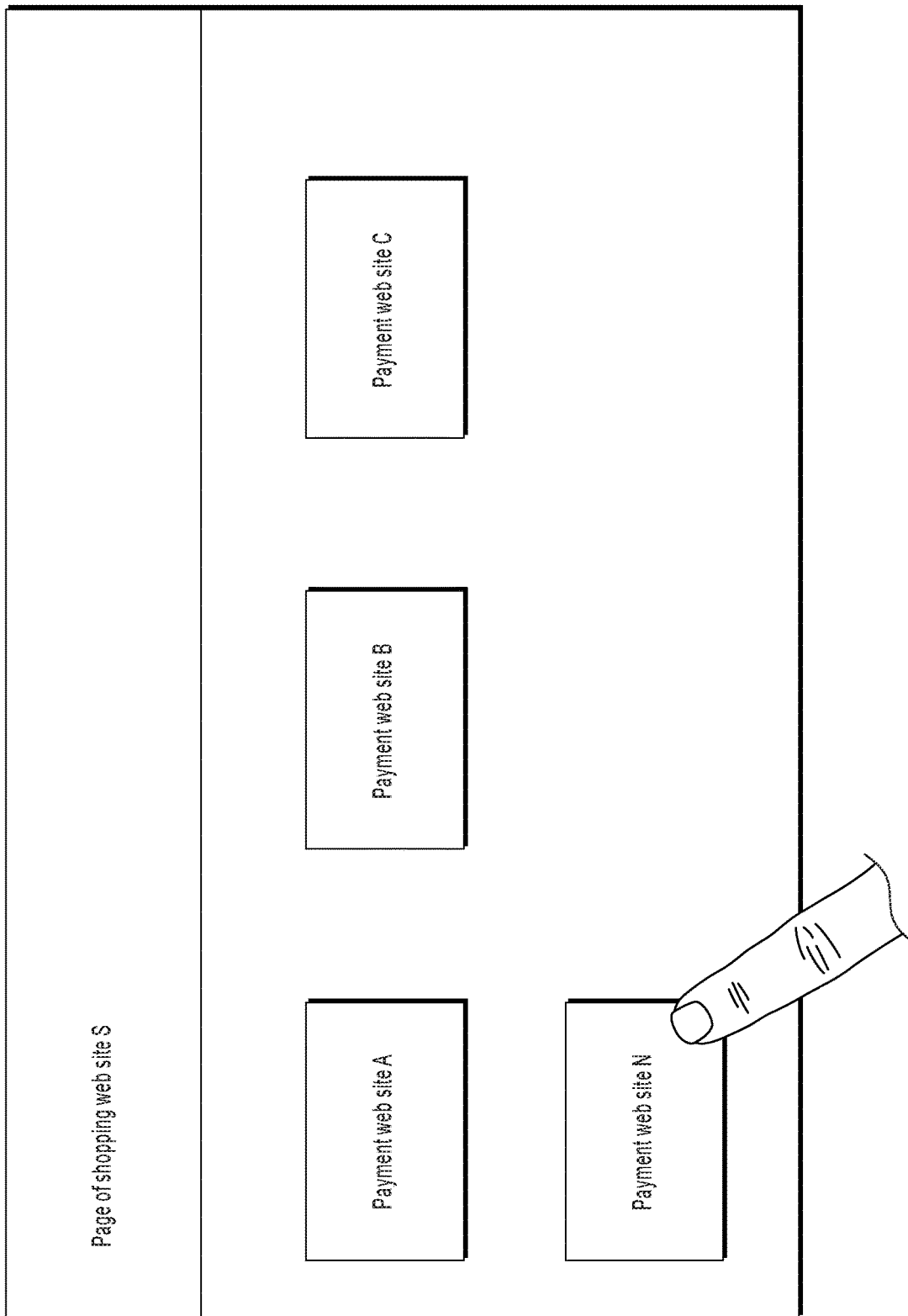
FIG. 7 is a schematic diagram illustrating display of an intermediate site, according to an example implementation of the present application.
Figure 8:
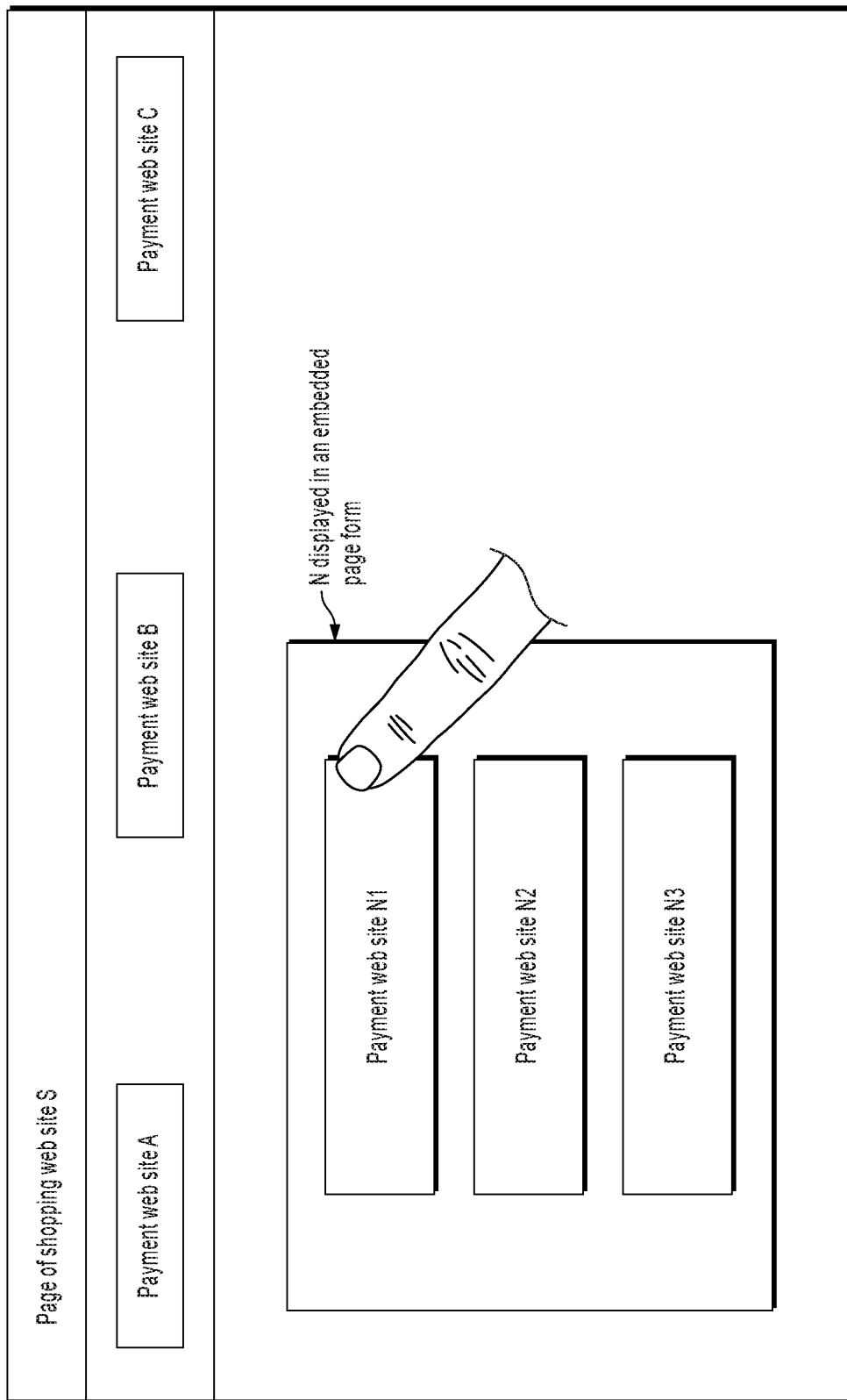
FIG. 8 is a schematic diagram illustrating a lower-layer site of an intermediate site, according to an example implementation of the present application.

When the user presses the checkout button on shopping website S, a page shown in FIG. 7 can be displayed. The page can include payment website A, payment website B, payment website C, and payment website N. After the user presses N, FIG. 8 is displayed. Payment websites N1, N2, and N3 are further linked to N for user selection. After N is pressed, a page of N is displayed as an embedded page of S. N1, N2, and N3 are displayed on the page of N. Displaying in an embedded page form can enable the user to select and switch to another website conveniently when the user does not want to use N. For example, the user can select payment website A.

Figure 9:
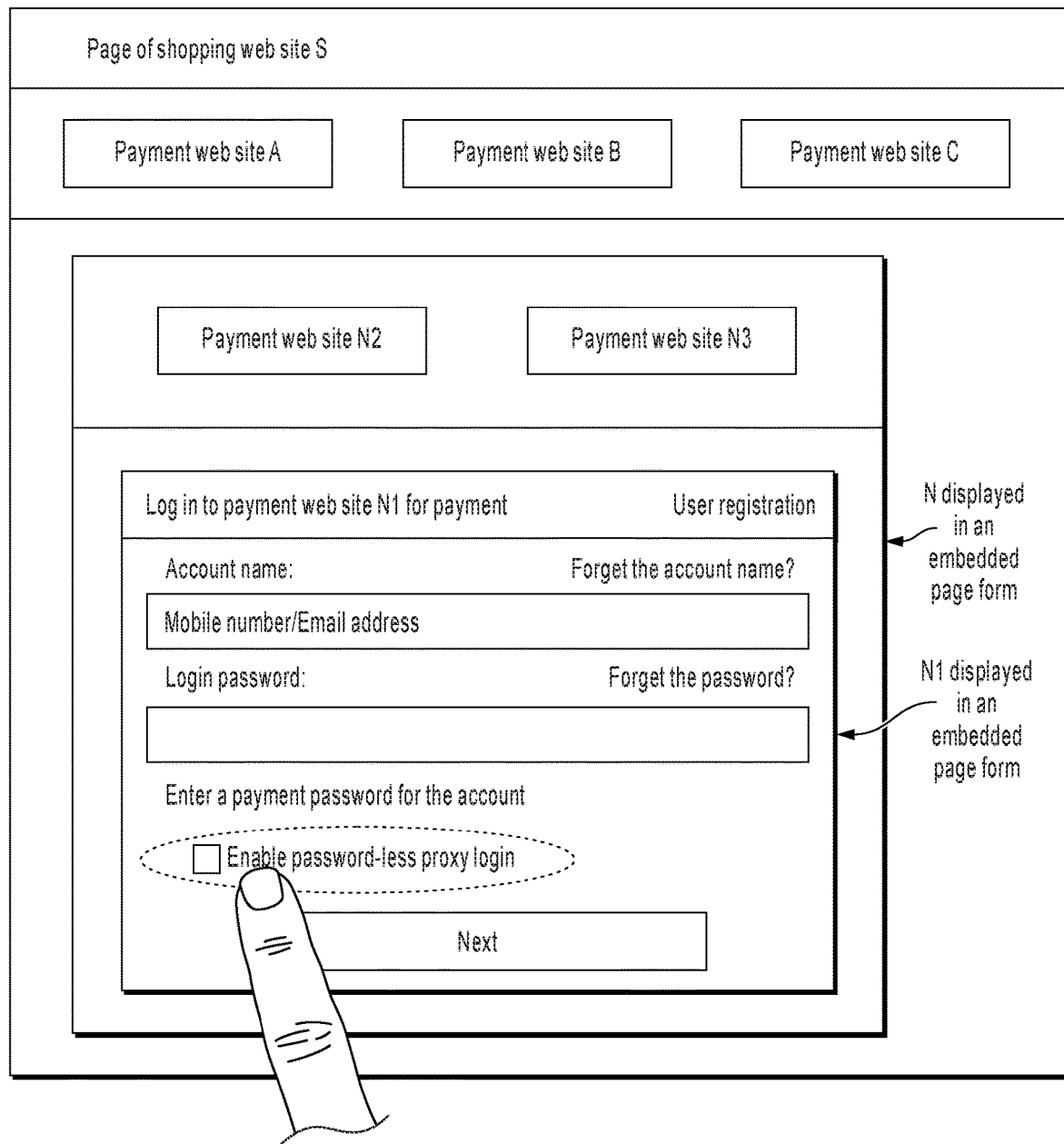
FIG. 9 is a schematic diagram illustrating a login page, according to an example implementation of the present application.

If password-free proxy login is initially set between N and N1, after the user selects payment website N1 on the page of N, a login page of N1 can be displayed. As shown in FIG. 9, the login page of N1 shown in FIG. 9 is similar to the page displayed in FIG. 1. The login page of N1 can also be displayed in an embedded page form, and N2 and N3 are displayed on the page of N at the same time, to facilitate switch by the user. If the user selects "Enable password-free proxy login" on the page, and presses "Next", website N1 will receive a password-free login setting request indication, creates a second token, and starts to perform the password-free proxy login setting process with payment website N. For a specific process, references can be made to the procedure between S and N in FIG. 3. Details are omitted here. Likewise, a password-free proxy login cancellation operation can be performed between N and N1 based on the procedure in FIG. 4.

After password-free proxy login is set, when the user presses the checkout button on shopping website S next time, the list page in FIG. 7 can still be displayed. However, when the user presses payment website N in FIG. 7, it is equivalent that N receives a website jump trigger. Generally, based on the website jump trigger, N displays a list including payment websites N1 to N3 in FIG. 8 to the user for selection. Because password-free proxy login has been set in the previous example, N can obtain, based on the website jump trigger, a token stored in cookies of a browser that N runs on, verifies a device fingerprint, and automatically sends a password-free login request to payment website N1 when verification succeeds. In other words, N performs the procedure shown in FIG. 5. Therefore, after the user presses payment website N, FIG. 10 can be directly displayed. Payment website N jumps to the logged-in page of payment website N1. The logged-in page displays an identifier indicating that password-free proxy login has been enabled. Certainly, the page of N can further simultaneously display payment websites N1 and N2 for the user to switch.

Figure 10:
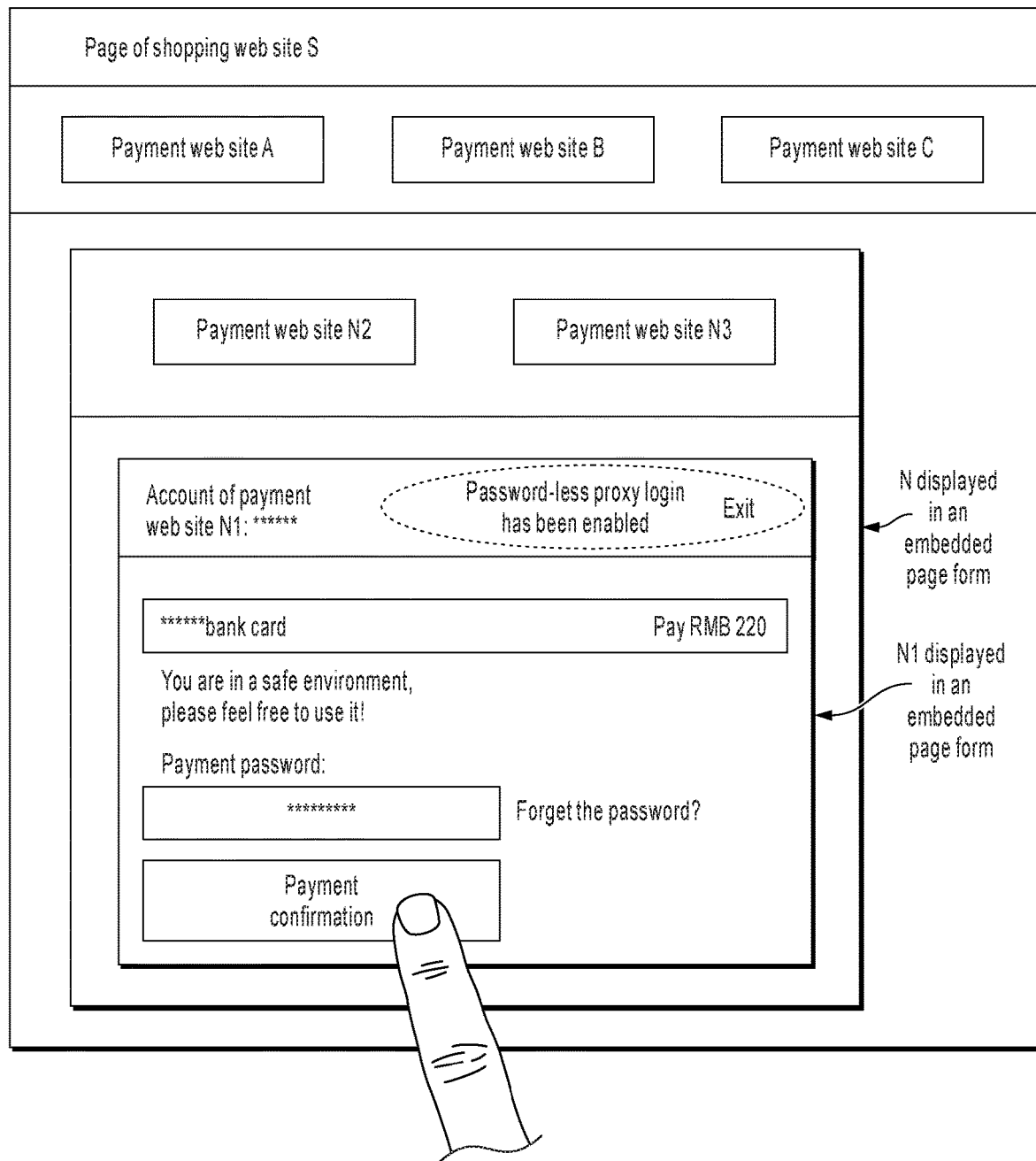
FIG. 10 is a schematic diagram illustrating a logged-in page, according to an example implementation of the present application.

In the previous example, payment website N is a site that can be logged in to without a password. For example, in FIG. 7 and FIG. 8, after the user presses N, a list including N1 to N3 can be directly displayed for user selection. Optionally, payment website N can be a site that needs to be logged in to by using a password. For example, after the user presses payment website N in FIG. 7, a login page of N can be displayed in an embedded page form first. N can be logged in to only after the user enters a user name and a password for N. The list including N1, N2, and N3 is displayed only after login succeeds. The password-free proxy login setting procedure and the password-free proxy login trigger procedure in this scenario are the same as the previous ones. For example, when setting password-free proxy login, the user first logs in to N, and then selects N1 for setting. For triggering password-free proxy login after setting succeeds, after the user presses N, N first requires the user to enter the user name and the password. After verification of login succeeds, N performs the procedure in FIG. 5, and automatically requests password-free login from N1. N can still jump to the page in FIG. 10, provided that the user logs in to N.

The password-free proxy login setting process and the password-free proxy login trigger process between N and N1 are described above in the S-N-N1 scenario with reference to FIG. 7 to FIG. 10. In addition, there can be another application example. For example, password-free proxy login can be set only between S and N by using the same method. Brief description is provided below: When the user presses the checkout button on shopping website S, a page similar to the page in FIG. 7 is displayed, and the user can select payment website N. Similarly, N needs or does not need a password. When N needs a password, the user enters the user name and the password to log in to N, which is similar to logging in to payment website A in FIG. 1, and chooses to enable password-free proxy login. Therefore, N starts to perform the password-free proxy login setting procedure in FIG. 3 with S. After setting succeeds, when the user presses "Checkout" in S next time, S can automatically jump to the logged-in page of N, and the user does not need to select N again. Certainly, because no password-free proxy login is set between N and N1 at this moment, the jumped-to logged-in page of N needs to display N1 to N3 for user selection. Even though N needs no password, an option "Enable password-free proxy login" that corresponds to N can be set on the page for user selection, so that the user when pressing N can notify N that password-free proxy login is to be enabled.

In the S-N-N1 scenario, in addition to the previous example that password-free proxy login is set between N and N1 or between S and N, password-free proxy login can be set not only between S and N but also between N and N1, to form two-layer password-free proxy login. As such, when the user presses the checkout button on shopping website S, shopping website S directly jumps to the logged-in page of payment website N1, so that N1 is logged in to without a password. Therefore, the user does not need to select payment website N, and does not need to select payment website N1 on payment website N, so that operation efficiency can be further improved.

In the previous two-layer password-free proxy login scenario, if shopping website S is referred to as a first website, payment website N is referred to as a second website, and payment website N1 is referred to as a third website. In an implemented operation of the previous example, the first website displays a logged-in page of a third website (N1) linked to one (N) of a plurality of second websites in response to user selection of a website jump trigger identifier.

In this example, password-free proxy login is actually performed twice between shopping website S and payment website N1, including password-free proxy login between S and payment website N, and password-free proxy login between payment website N and payment website N1. A password-free proxy login setting procedure and a password-free proxy login trigger procedure of each of the two layers are the same as those in the previous example. Details are omitted here for simplicity. When the two-layer password-free proxy login is triggered, from the perspective of N, the previous operation is implemented as follows: After N is logged in to through S through password-free proxy, N can perform the following procedure, so that N1 can be logged in to through N through password-free proxy. Actually, the procedure is the same as that of logging in to N through S through password-free proxy.

After payment website N is logged in to without a password, payment website N obtains a fifth token stored in cookies of a browser that payment website N runs on. The fifth token includes a website identifier of one of a plurality of payment websites, such as payment website N1, and a device fingerprint used to indicate a running environment where password-free proxy login is set for N1.

If payment website N determines, based on the device fingerprint, that a current running environment is the same as the running environment where password-free proxy login is set for N1, payment website N obtains a sixth token that corresponds to the fifth token. The sixth token is an access token indicating that payment website N1 grants password-free login permission after user login succeeds.

Payment website N sends, based on the website identifier in the fifth token, a password-free login request including the sixth token to payment website N1 that corresponds to the website identifier, and logs in to payment website N1 without a password after payment website N1 successfully verifies the sixth token.

In the previous scenario example, password-free proxy login among three websites (S-N-N1) is used as an example to describe the method in the present application. In specific implementation, password-free proxy login can be implemented through cooperation among more layers of websites, for example, four layers of websites (e.g. S-N-N1-N11), five layers of websites, or more layers of websites. A method is the same as that of password-free proxy login among the previous three websites. Details are omitted here.

The website login method in the implementations of the present application can be performed by a website, and to be specific, can be performed by a server-side or a client-side of the website. For example, when the method is performed by the payment website that serves as the second website, a server of the payment website can create the second token. For another example, when the method is performed by the payment website that serves as the first website, a client of the payment website can verify the device fingerprint based on the first token. When the website login method in the present application is implemented in a form of a software functional unit and sold or used as an independent product, the website login method can be stored in a computer-readable storage medium. Based on such an understanding, the technical solutions of the present application essentially, or the part contributing to the existing technology, or a part of the technical solutions can be implemented in a form of a software product. The computer software product is stored in a storage medium, and includes several instructions for instructing a computer device (which can be a personal computer, a server, or a network device) to perform all or some of the steps of the methods described in the implementations of the present application. The previous storage medium includes various media that can store program code, such as a USB flash drive, a removable hard disk, a read-only memory (ROM), a random access memory (RAM), a magnetic disk, or an optical disc.

Figure 11:
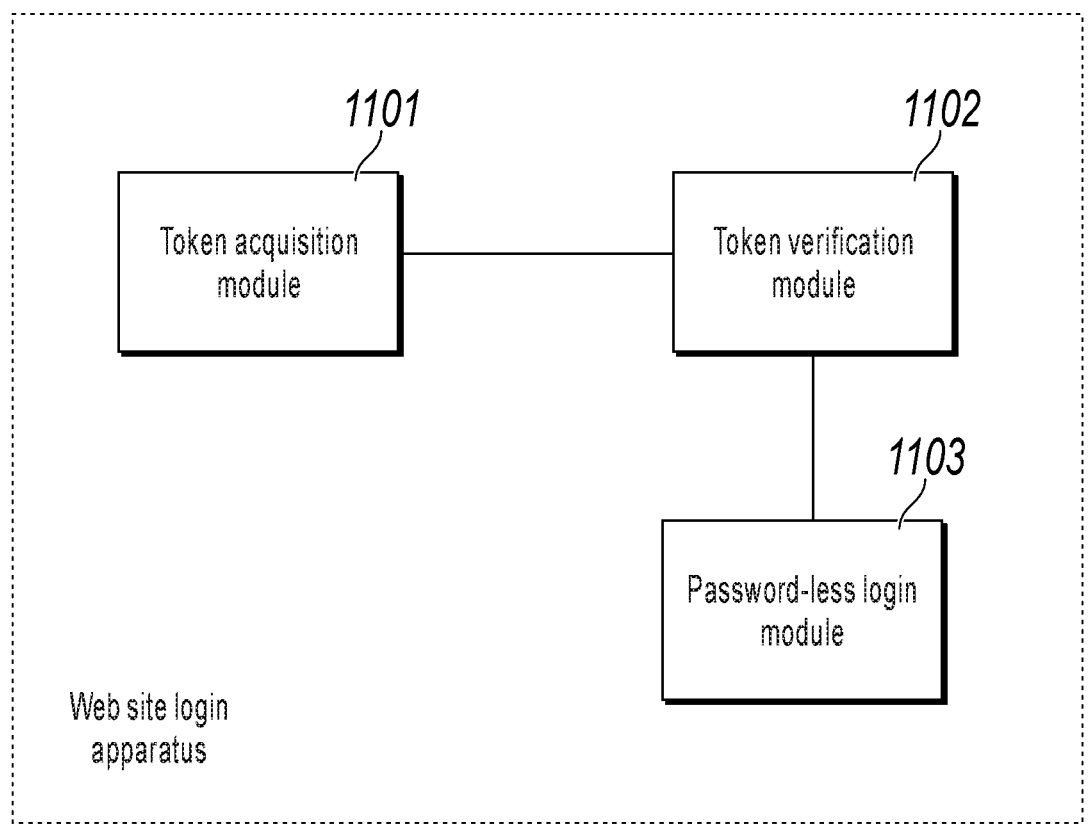
FIG. 11 is a structural diagram illustrating a website login apparatus, according to an example implementation of the present application.

FIG. 11 provides a website login apparatus, and the apparatus can be applied to a first website, so as to log in to a second website through the first website through password-free proxy. The apparatus can include a token acquisition module 1101, a token verification module 1102, and a password-free login module 1103.

The token acquisition module 1101 is configured to obtain a first token stored in cookies of a browser that the first website runs on, when a website jump trigger is received, where the first token includes a website identifier of a second website on a second website list page indicated by the website jump trigger, and a device fingerprint used to indicate a running environment where password-free proxy login is set for the second website.

The token verification module 1102 is configured to obtain a second token that corresponds to the first token, if it is determined based on the device fingerprint that a current running environment is the same as the running environment where password-free proxy login is set for the second website, where the second token is an access token indicating that the second website grants password-free login permission after user login succeeds.

The password-free login module 1103 is configured to send, based on the website identifier in the first token, a password-free login request including a third token to the second website that corresponds to the website identifier, where the third token includes the second token; and log in to the second website without a password when the second website successfully verifies the second token.

Figure 12:
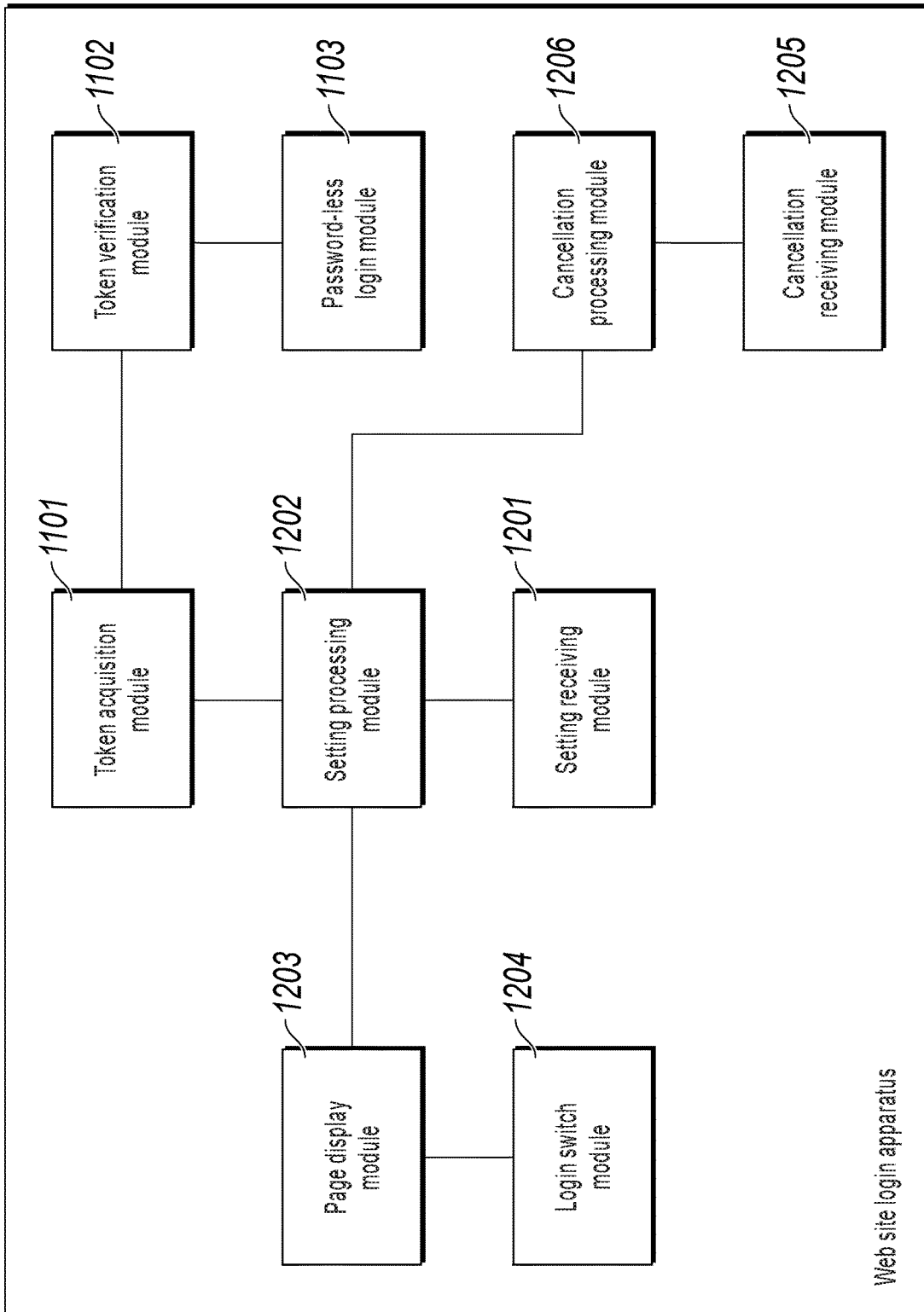
FIG. 12 is a structural diagram illustrating another website login apparatus, according to an example implementation of the present application.

In an example, as shown in FIG. 12, the apparatus can further include a setting receiving module 1201 and a setting processing module 1202.

The setting receiving module 1201 is configured to receive a password-free proxy login setting request sent by the second website, where the password-free proxy login setting request includes the second token.

The setting processing module 1202 is configured to create the first token including the device fingerprint; store the first token in the cookies of the browser; store a correspondence between the first token and the second token; and notify the second website that password-free proxy login is successfully set.

In an example, the apparatus can further include a page display module 1203 and a login switch module 1204.

The page display module 1203 is configured to display a logged-in page of the second website in an embedded page form after the second website is logged in to without a password. When the cookies of the browser store a plurality of first tokens that separately correspond to different second websites, display, on the same page as the embedded page and based on website identifiers in the first tokens, another second website that has enabled password-free proxy login through the first website.

The login switch module 1204 is configured to send a password-free login request to the other second website, and add a second token that corresponds to a first token of the other second website to the third token, if it is detected that a user selects the other second website.

In an example, the page display module 1203 is configured to select one of the second websites based on a predetermined selection rule, when the website jump trigger is received, to perform password-free proxy login, if the cookies of the browser store a plurality of first tokens that separately correspond to different second websites.

In an example, the apparatus further includes a cancellation receiving module 1205 and a cancellation processing module 1206.

The cancellation receiving module 1205 is configured to receive a password-free proxy login cancellation request sent by the second website, where the password-free proxy login cancellation request includes a third token, the third token is an indication created by the second website for canceling password-free proxy login, and the third token includes the website identifier of the second website.

The cancellation processing module 1206 is configured to obtain, based on the website identifier in the third token, the first token including the second website; and delete the first token and the second token that corresponds to the first token.

In an example, the first website is a shopping website, and the second website is a payment website; or the first website is a payment website, and the second website is another payment website linked to the payment website.

Figure 13:
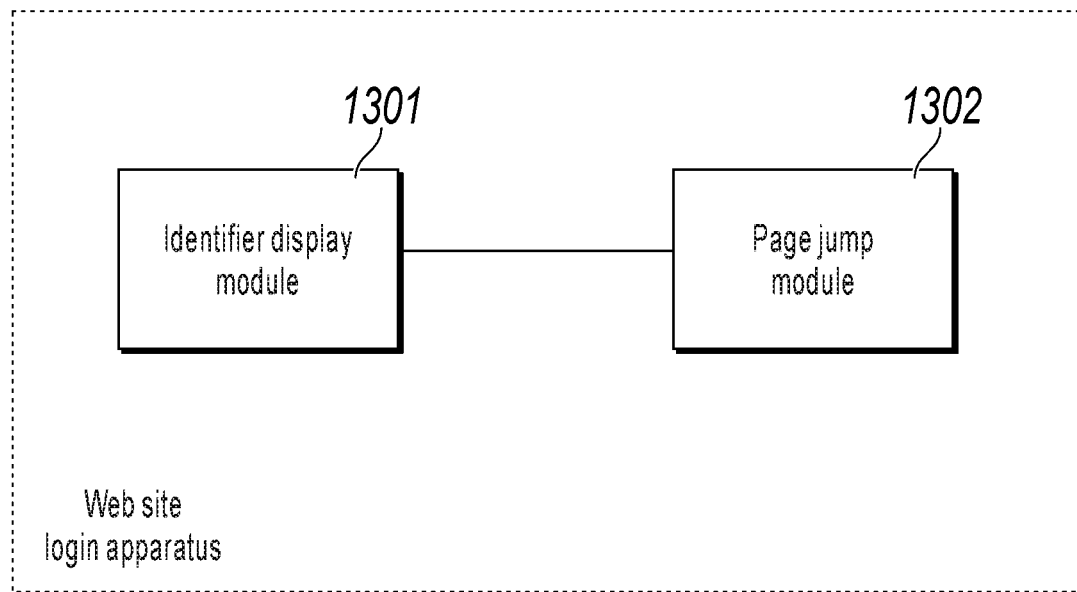
FIG. 13 is a structural diagram illustrating still another website login apparatus, according to an example implementation of the present application.

FIG. 13 provides a website login apparatus, and the apparatus can be applied to a first website, so as to log in to a second website through the first website through password-free proxy. The apparatus can include an identifier display module 1301 and a page jump module 1302.

The identifier display module 1301 is configured to display a website jump trigger identifier on a page, where the website jump trigger identifier is used to, when selected, trigger the first website to jump to a website list page including a plurality of second websites to be selected.

The page jump module 1302 is configured to: in response to user selection of the website jump trigger identifier, jump to a logged-in page that displays one of the plurality of second websites on the website list page.

Figure 14:
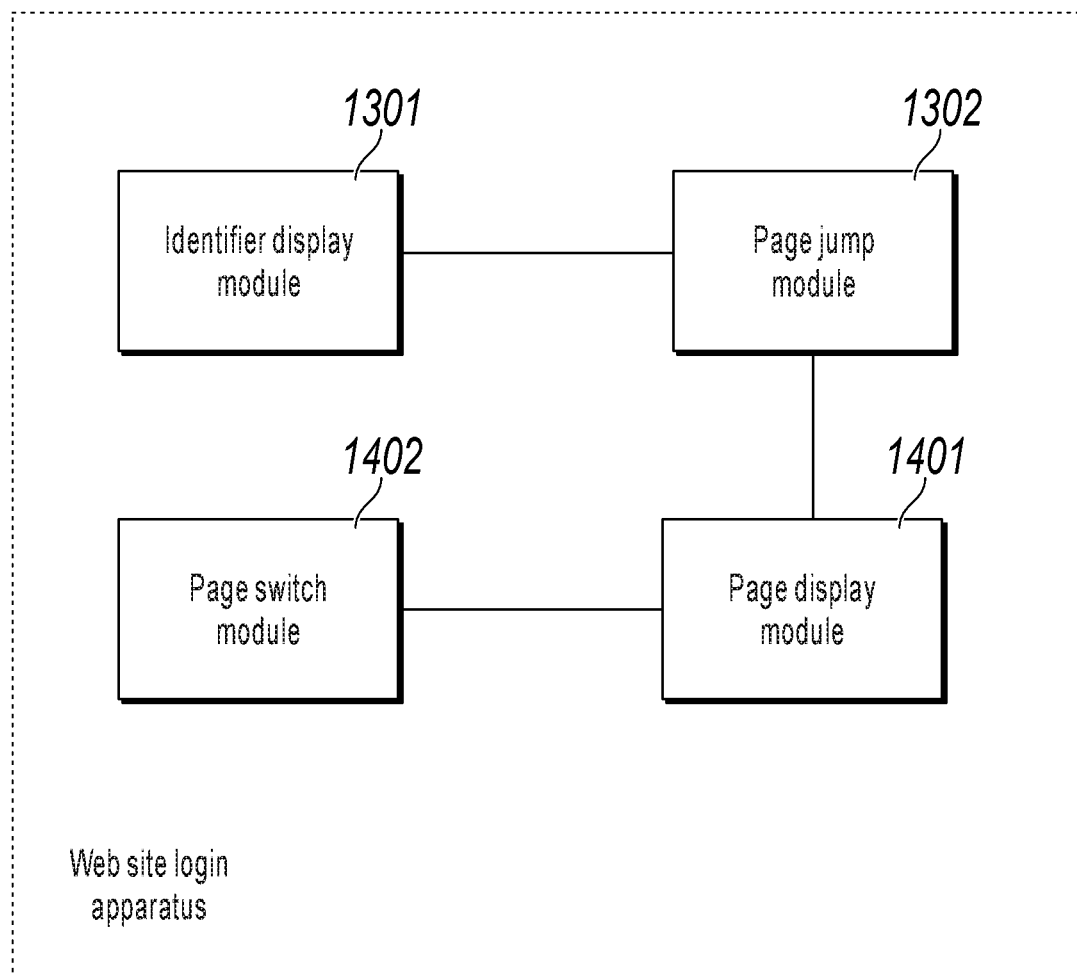
FIG. 14 is a structural diagram illustrating still another website login apparatus, according to an example implementation of the present application.

In an example, the second website is displayed on the first website in an embedded page form, and the logged-in page of the second website displays an indication indicating that password-free proxy login has been enabled. As shown in FIG. 14, the apparatus can further include a page display module 1401 and a page switch module 1402.

The page display module 1401 is configured to display another second website that has enabled password-free proxy login.

The page switch module 1402 is configured to: in response to user selection of the other second website, switch to a logged-in page of the other second website in a location of the embedded page.

In an example, the second website is further linked to a plurality of third websites to be selected. The page jump module 1302 is further configured to display a logged-in page of a third website linked to one of the plurality of second websites in response to user selection of the website jump trigger identifier.

Figure 15:
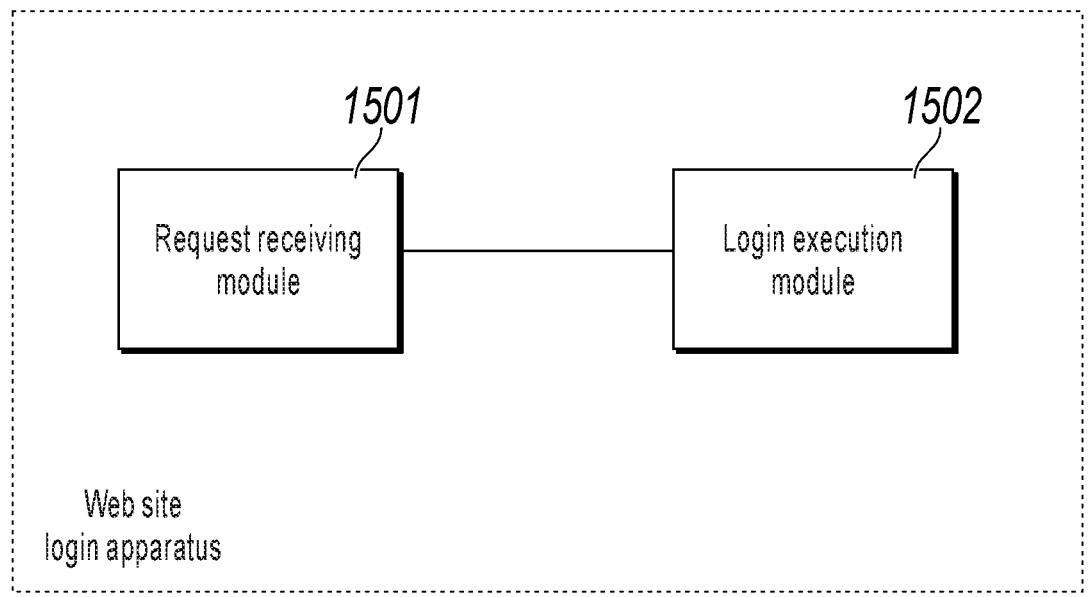
FIG. 15 is a structural diagram illustrating still another website login apparatus, according to an example implementation of the present application.

FIG. 15 provides a website login apparatus, and the apparatus can be applied to a second website, so as to log in to the second website through a first website through password-free proxy. The apparatus can include a request receiving module 1501 and a login execution module 1502.

The request receiving module 1501 is configured to receive a password-free login request sent by the first website, where the password-free login request includes a third token, the third token includes a second token, and the second token is an access token indicating that the second website grants password-free login permission after user login succeeds.

The login execution module 1502 is configured to: when verification of the second token succeeds, perform password-free login.

Figure 16:
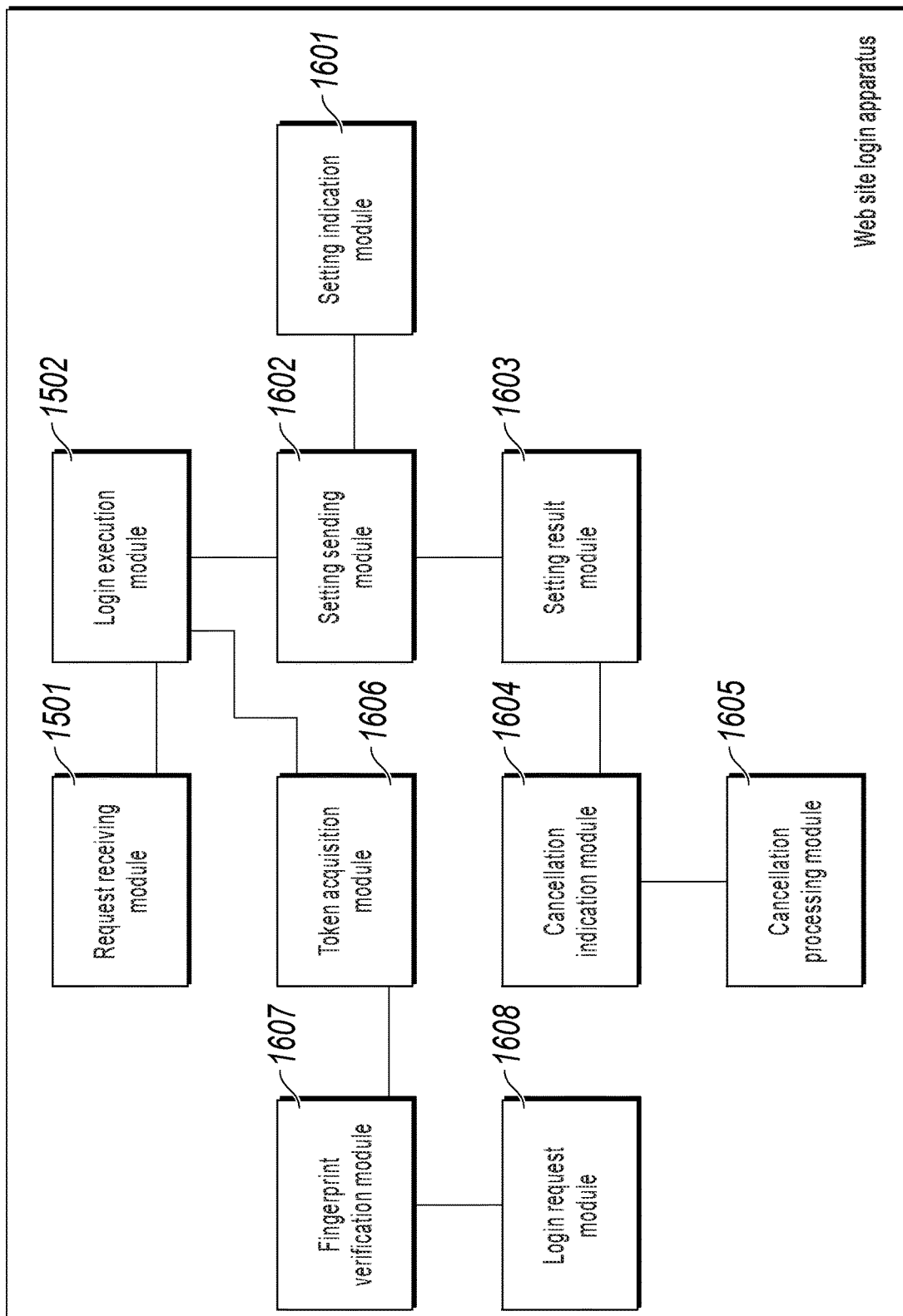
FIG. 16 is a structural diagram illustrating still another website login apparatus, according to an example implementation of the present application.

In an example, as shown in FIG. 16, the apparatus can further include a setting indication module 1601, a setting sending module 1602, and a setting result module 1603.

The setting indication module 1601 is configured to receive login information for requesting login and a password-free login setting request indication.

The setting sending module 1602 is configured to create the second token based on the indication after verification of the login information succeeds; and send a password-free proxy login setting request including the second token to the first website, so that the first website creates, based on the password-free proxy login setting request, a first token including a device fingerprint, and stores a correspondence between the first token and the second token.

The setting result module 1603 is configured to receive a notification sent by the first website indicating that password-free proxy login is successfully set, and display that password-free proxy login has been enabled on a logged-in page of the second website.

In an example, the apparatus can further include a cancellation indication module 1604 and a cancellation processing module 1605.

The cancellation indication module 1604 is configured to further display, on the logged-in page after password-free login is performed, an option that can be selected by a user for exiting password-free proxy login.

The cancellation processing module 1605 is configured to create a fourth token used to instruct to cancel password-free proxy login, when a trigger to the option of exiting password-free proxy login is received, where the fourth token includes a website identifier of the second website; and send a password-free proxy login cancellation request including the fourth token to the first website, so that the first website cancels password-free proxy login of the second website based on the fourth token.

In an example, the second website is further linked to a plurality of third websites to be selected, and the apparatus can further include a token acquisition module 1606, a fingerprint verification module 1607, and a login request module 1608.

The token acquisition module 1606 is configured to obtain a fifth token stored in cookies of a browser that the second website runs on, after password-free login is performed where the fifth token includes a website identifier of one of the third websites and a device fingerprint used to indicate a running environment where password-free proxy login is set for the third website.

The fingerprint verification module 1607 is configured to obtain a sixth token that corresponds to the fifth token, if it is determined based on the device fingerprint that a current running environment is the same as the running environment where password-free proxy login is set for the third website, where the sixth token is an access token indicating that the third website grants password-free login permission after user login succeeds.

The login request module 1608 is configured to send, based on the website identifier in the fifth token, a password-free login request including the sixth token to the third website that corresponds to the website identifier; and log in to the third website without a password after the third website successfully verifies the sixth token.

The previous descriptions are merely example implementations of the present application, but are not intended to limit the present application. Any modification, equivalent replacement, or improvement made without departing from the spirit and principle of the present application shall fall within the protection scope of the present application.

Figure 17:
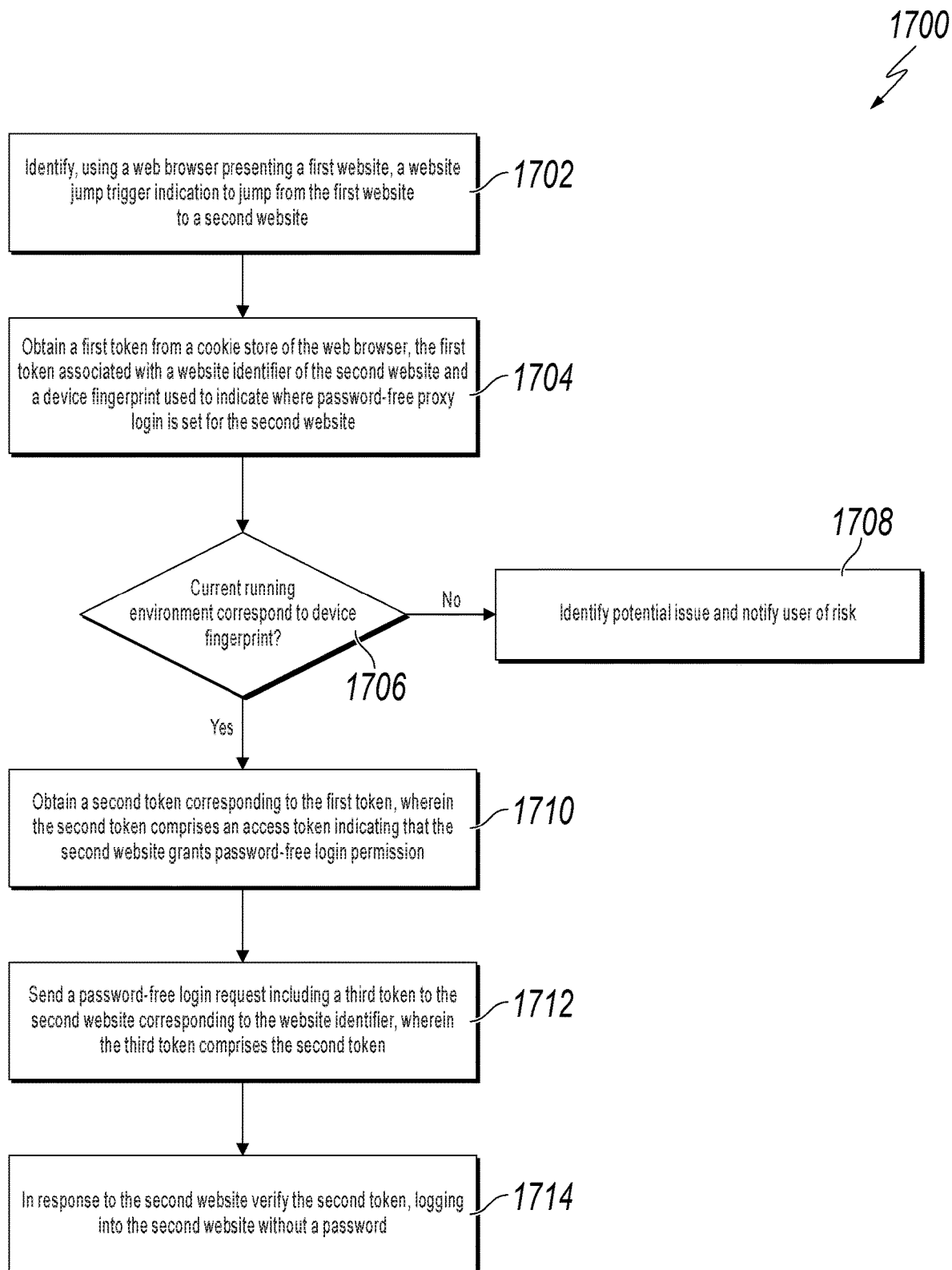
FIG. 17 is a flowchart illustrating an example of a computer-implemented method for applying a password-free proxy login, according to an implementation of the present disclosure.

FIG. 17 is a flowchart illustrating an example of a computer-implemented method for applying a password-free proxy login, according to an implementation of the present disclosure. For clarity of presentation, the description that follows generally describes method 1700 in the context of the other figures in this description. However, it will be understood that method 1700 can be performed, for example, by any system, environment, software, and hardware, or a combination of systems, environments, software, and hardware, as appropriate. In some implementations, various steps of method 1700 can be run in parallel, in combination, in loops, or in any order.

In general, method 1700 can be used when transitioning from a first website to a second website. In some instance, the first website may be a shopping website, while the second website is a payment website, although various other implementations may be used. When interacting with a first website, a UI element such as a buttom may be linked to a transfer or transition from the first website to one of a plurality of second websites. In the shopping website example, a checkout button can be selected that causes a payment process to be initiated. Where one or more payment websites are associated with the shopping website, a password-free transition can occur between the sites, allowing both sites to perform security-related verifications prior to allowing the transition. In some instances, multiple sites may be associated with the UI element, such that when the UI button or element is triggered or selected, two or more second sites may be possible destinations. In some instances, one of the multiple sites may use the current solution to allow for a password-free login. In some instances, at least one of the other sites may also be able to perform the process. In some instances, only one of the sites may be logged into using the process, while the other site(s) is available to use the solution upon selection or indication by the user. In other instances, both sites may be logged into without passwords using the present solution, and can allow the user of the website to interact with the site of choice.

Turning to the illustrated implementation, at 1702, a website jump trigger indication can be identified by a first website or by a web browser presenting the first website. The website jump trigger indication can be any suitable indication or interaction from the first website that is associated with a move, transition, or jump to a second website. In some instances, the website jump trigger indication may be associated with the triggering or selection of a particular button on the first website. In one example, a checkout or process button may be selected to initiate the website jump trigger indication. From 1702, method 1700 proceeds to 1704.

At 1704, a first token is obtained from a cookie store of the web browser associated with the first website. The obtained first token is associated with a website identifier of the second website as well as with a device fingerprint, where the device fingerprint is used to uniquely identify a running environment of a client computer system that existed when the first token was generated in response to setting a password-free proxy login for the second website. In general, the device fingerprint serves as an identifier indicating a running environment where a current password-free proxy login is set. The running environment can include, for example, a current computer and a browser that the shopping website and the payment website run on. In one implementation, for example, client code, such as JavaScript or Flash used in the browser, can be used to actively collect browser platform information, for example, a browser language. Server code, for example, Java or Python, can be used to actively collect field information such as operating system code in network protocols of various layers such as HTTP and TCP/IP. A device fingerprint can be used to uniquely identify a client computer (including a browser) after a combination of the data collection operations or process. In some instances, the device fingerprint can be encrypted using a public key of the first website. The website identifier (e.g., the website name) of the second website can be included in or associated with the second token, and, in some instances, can be encrypted using the public key of the first website. The website identifier of the second website can enable the first website to learn or identify that the first token is specific to the second website, and that the second website has enabled password-free proxy login. In some instances, a current time may be included in the first token. The current time signed by the first website can be used by an internal policy of the first website to determine whether the token expires or has expired. For example, if the token exceeds a predetermined time length (e.g., three months), password-free proxy login is invalid. From 1704, method 1700 proceeds to 1706.

At 1706, a determination is made as to whether the current running environment corresponds to the device fingerprint. If it is determined that the current running environment does not correspond to the device fingerprint, method 1700 proceeds to 1708. Otherwise, if it is determined that the current running environment does correspond to the device fingerprint, method 1700 proceeds to 1710. In general, the device fingerprint analysis ensures that the same system (e.g., the same computer and browser) used to generate or associated with the generation of the first token is the same as the current system requesting the password-free login. At 1708, when the current running environment does not correspond to the device fingerprint, the mismatch can be determined as a potential security issue, and a notification can be provided to a user associated with the first token. Additional security-related actions can be performed by the first website in response to the determination. If the digital fingerprint corresponds to the current environment, method 700 continues at 1710.

At 1710, a second token corresponding to the first token is obtained, where the second token comprises an access token indicating that the second website has previously granted password-free login permission. In some instances, the second token may be stored at and obtained from a location other than the cookie store, such as a backend database or other remotely located store.

At 1712, a password-free login request is sent from the first website to the second website corresponding to the website identifier in the second token, where the request includes a third token. The third token may be the same as or may include the second token. In some instances, the request can be sent using a URL of a hidden embedded iFrame. The embedded iFrame can point to a login page of the second website, and the URL can include parameters indicating the first website and the third token. In some instances, the third token may include a signed version of the second token, such as where the second token is signed by the first website so that the second website can perform verification on the request. In some instances, the second website can identify a user name as signed by the first website to insure authenticity of the request. In some instances, a current time may be signed by the first website and included in the third token.

In response to the second website verifying the second (and, the third) token, the first website may be logged into the second website without a password being submitted or transmitted to the second website. The verification operations can include any suitable operations. Once verification is complete, the second website can be logged into, and, in some instances, the second website can be presented in a suitable iFrame or other embedded page within the presentation of the first website.

Figure 18:
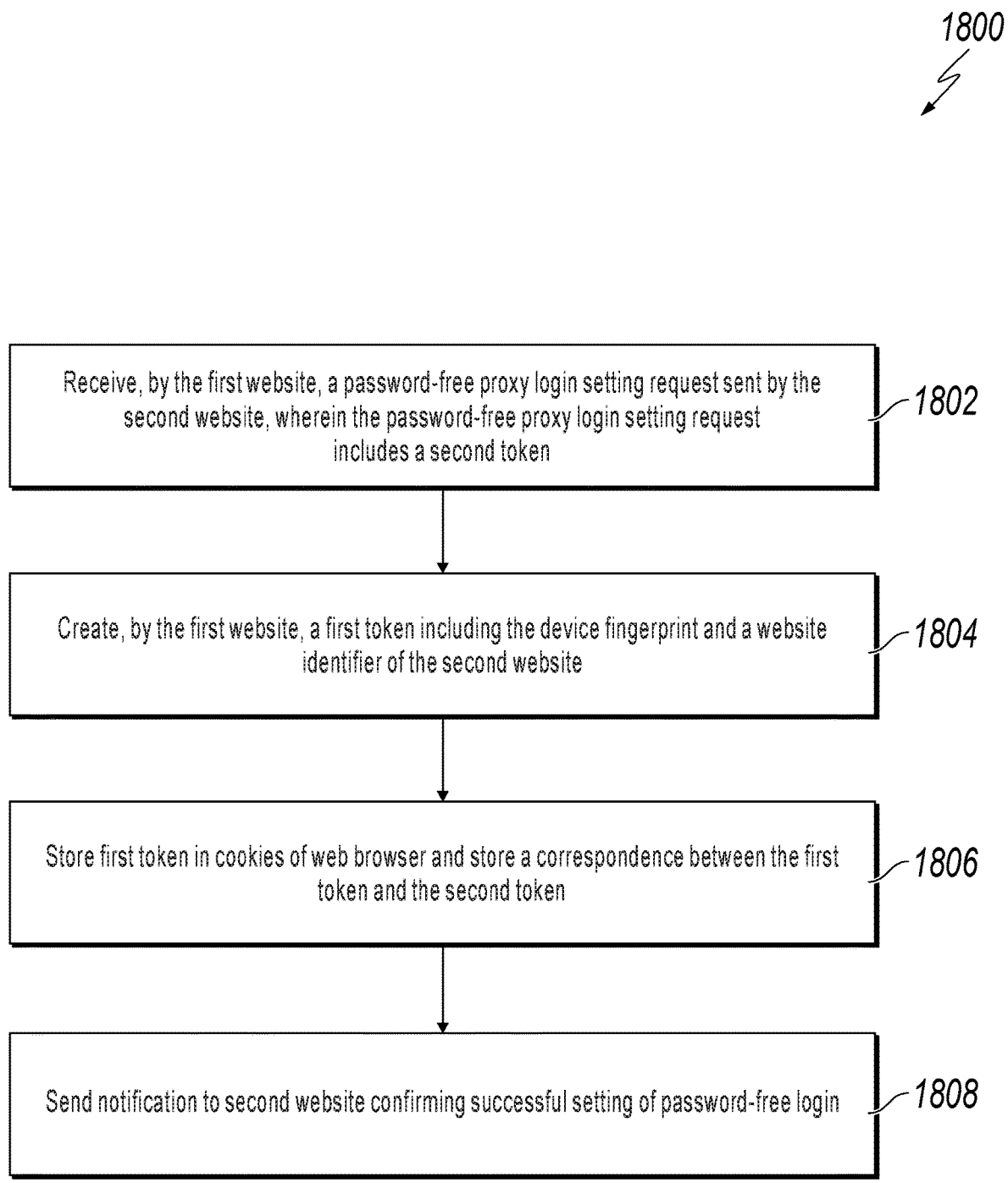
FIG. 18 is a flowchart illustrating an example of a computer-implemented method for setting a password-free proxy login, according to an implementation of the present disclosure.

FIG. 18 is a flowchart illustrating an example of a computer-implemented method for setting a password-free proxy login, according to an implementation of the present disclosure. For clarity of presentation, the description that follows generally describes method 1800 in the context of the other figures in this description. However, it will be understood that method 1800 can be performed, for example, by any system, environment, software, and hardware, or a combination of systems, environments, software, and hardware, as appropriate. In some implementations, various steps of method 1800 can be run in parallel, in combination, in loops, or in any order. In general, the password-free proxy login setting operations can be performed before a password-free proxy login set of operations are performed. Additionally, the described password-free proxy login setting operations may be performed for a plurality of second websites, so that multiple second websites are capable of providing password-free proxy login solutions to a first website.

At 1802, a password-free proxy login setting request sent by a second website can be received by the first website. The password-free proxy login setting request can include a second token, in some instances similar to the second token described in FIG. 17. For example, the second token may be an access token generated by the second website after successfully verifying the user name and password entered by a user via the first website. The second token can include a website identifier signed by the second website and a user name associated with the user requesting the password-free proxy login. In some instances, a current time of the generation of the second token may be included in the second token. In some instances, the website identifier can be signed by a private key of the second website, and the user name can be encrypted using a public key of the second website and signed using the second website's private key. The website identifier can be used by the second website to authenticate the setting request. The current time can be used to indicate that tokens created at different times change with time, and can be used to avoid repetition and theft. The encrypted and signed user name can be used to securely identify the identity of the user associated with the attempt at the password-free login. From 1802, method 1800 proceeds to 1804.

At 1804, a first token including a device fingerprint and a website identifier of the second website can be created by the first website. In some instances, the first website may first verify the authenticity of the password-free proxy login setting request, such as by using the public key of the second website to authenticate the website identifier included in the second token. When the first website determines that the request is actually sent by the second website, the first website can create the first token. The first token, in some instances, can include a device fingerprint identifying a running environment where the current password-free proxy login is set. The device fingerprint can include, for example, a current computer and browser that the websites are currently being run on. In other words, the device fingerprint can uniquely identify a client computer and its running environment at the time the first token is created. In some instances, the digital fingerprint can be encrypted using a public key of the first website. The first token may also include a website identifier of the second website to link the first token to the corresponding second website. In some instances, the website identifier can be encrypted using a public key of the first website. The website identifier in the first token can confirm and allow the first website to know that the first token is specific to the second website, and that the second website has enable password-free proxy login. From 1804, method 1800 proceeds to 1806.

At 1806, the first token can be stored with other cookies in a web browser, and a correspondence or other link between the first token and the corresponding second token can be stored. The second token associated with the second website can be stored in a backend database of the website, or another location remote from the cookie store where the first token is stored. In such instances, the second token can be linked to or associated with the first token stored in the cookie store of the web browser. From 1806, method 1800 proceeds to 1808.

At 1808, the first website can send a notification to the second website confirming the successful setting of the password-free proxy login.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/ augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:

identifying, using a web browser presenting a first website, a website jump trigger indication to jump from the first website to a second website, wherein the first website is a shopping website and wherein the second website is a payment website;

in response to identifying the website jump trigger indication, obtaining: i) a first token from a cookie store of the web browser, the first token associated with a website identifier of the second website and ii) a device fingerprint indicating a running environment at a time when a password-free proxy login was previously set, wherein the cookie store stores a plurality of first tokens that separately correspond to different second websites;

in response to determining that a current running environment corresponds to the running environment indicated by the device fingerprint, obtaining a second token corresponding to the first token, wherein the second token comprises an access token indicating that the second website grants password-free login permissions;

sending, using the web browser, a password-free login request to the second website, the password-free login request comprising a third token corresponding to the website identifier of the second website, wherein the third token includes the second token;

in response to the second website verifying the second token, logging into the second website without a password;

displaying a logged-in page of the second website in an embedded page associated with the first website; and displaying, on a same page as the embedded page associated with the first website based on the website identifiers associated with the first tokens, at least one other second website that has enabled the password-free proxy login through the first website.

2. The computer-implemented method of claim 1, further comprising, prior to identifying the website jump trigger indication:
- receiving, by the first website, a password-free proxy login setting request sent by the second website, wherein the password-free proxy login setting request comprises the second token;
- creating, by the first website, the first token comprising the device fingerprint;
- storing the first token in the cookie store of the web browser;
- storing a correspondence between the first token and the second token; and
- notifying the second website that password-free proxy login is successfully set.

3. The computer-implemented method of claim 2, further comprising:
- storing the second token in a backend database separate from the cookie store of the web browser, wherein obtaining the second token comprises obtaining the second token from the backend database.

4. The computer-implemented method of claim 1, further comprising, in response to a user selection associated with a third website:
- sending, using the web browser, a second password-free login request to the third website, the second password-free login request comprising a fourth token corresponding to the website identifier of the third website, wherein the fourth token includes a second token corresponding to the third website.

5. The computer-implemented method of claim 4, wherein, when the cookie store stores the plurality of first tokens that separately correspond to different second websites, the method further comprising:
- when identifying, using the web browser presenting the first website, the website jump trigger indication, selecting one of the second website or the third website, based on a predetermined selection rule, to perform password-free proxy login.

6. The computer-implemented method of claim 1, further comprising:
- receiving a password-free proxy login cancellation request sent by the second website, wherein the password-free proxy login cancellation request comprises a fourth token, wherein the fourth token is an indication created by the second website for canceling password-free proxy login, and wherein the third token comprises the website identifier of the second website;
- obtaining, based on the website identifier in the fourth token, the first token corresponding to the second website; and
- deleting the first token and the second token that corresponds to the first token.

7. A non-transitory, computer-readable medium storing one or more instructions executable by a computer system to perform operations comprising:
- identifying, using a web browser presenting a first website, a website jump trigger indication to jump from the first website to a second website, wherein the first website is a shopping website and wherein the second website is a payment website;
- in response to identifying the website jump trigger indication, obtaining: i) a first token from a cookie store of the web browser, the first token associated with a website identifier of the second website and ii) a device fingerprint indicating a running environment at a time when a password-free proxy login was previously set, wherein the cookie store stores a plurality of first tokens that separately correspond to different second websites;
- in response to determining that a current running environment corresponds to the running environment indicated by the device fingerprint, obtaining a second token corresponding to the first token, wherein the second token comprises an access token indicating that the second website grants password-free login permissions;
- sending, using the web browser, a password-free login request to the second website, the password-free login request comprising a third token corresponding to the website identifier of the second website, wherein the third token includes the second token;
- in response to the second website verifying the second token, logging into the second website without a password;
- displaying a logged-in page of the second website in an embedded page associated with the first website; and
- displaying, on a same page as the embedded page associated with the first website based on the website identifiers associated with the first tokens, at least one other second website that has enabled the password-free proxy login through the first website.

8. The non-transitory, computer-readable medium of claim 7, the operations further comprising, prior to identifying the website jump trigger indication:
- receiving, by the first website, a password-free proxy login setting request sent by the second website, wherein the password-free proxy login setting request comprises the second token;
- creating, by the first website, the first token comprising the device fingerprint;
- storing the first token in the cookie store of the web browser;
- storing a correspondence between the first token and the second token; and
- notifying the second website that password-free proxy login is successfully set.

9. The non-transitory, computer-readable medium of claim 8, the operations further comprising:
- storing the second token in a backend database separate from the cookie store of the web browser, wherein obtaining the second token comprises obtaining the second token from the backend database.

10. The non-transitory, computer-readable medium of claim 7, the operations further comprising, in response to a user selection associated with a third website:
- sending, using the web browser, a second password-free login request to the third website, the second password-free login request comprising a fourth token corresponding to the website identifier of the third website, wherein the fourth token includes a second token corresponding to the third website.

11. The non-transitory, computer-readable medium of claim 10, wherein, when the cookie store stores the plurality of first tokens that separately correspond to different second websites, the operations further comprising:
- when identifying, using the web browser presenting the first website, the website jump trigger indication, selecting one of the second website or the third website, based on a predetermined selection rule, to perform password-free proxy login.

12. The non-transitory, computer-readable medium of claim 7, the operations further comprising:

receiving a password-free proxy login cancellation request sent by the second website, wherein the password-free proxy login cancellation request comprises a fourth token, wherein the fourth token is an indication created by the second website for canceling password-free proxy login, and wherein the third token comprises the website identifier of the second website;

obtaining, based on the website identifier in the fourth token, the first token corresponding to the second website; and deleting the first token and the second token that corresponds to the first token.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
  identifying, using a web browser presenting a first website, a website jump trigger indication to jump from the first website to a second website, wherein the first website is a shopping website and wherein the second website is a payment website;
  in response to identifying the website jump trigger indication, obtaining: i) a first token from a cookie store of the web browser, the first token associated with a website identifier of the second website and ii) a device fingerprint indicating a running environment at a time when a password-free proxy login was previously set, wherein the cookie store stores a plurality of first tokens that separately correspond to different second websites;
  in response to determining that a current running environment corresponds to the running environment indicated by the device fingerprint, obtaining a second token corresponding to the first token, wherein the second token comprises an access token indicating that the second website grants password-free login permissions;
  sending, using the web browser, a password-free login request to the second website, the password-free login request comprising a third token corresponding to the website identifier of the second website, wherein the third token includes the second token;
  in response to the second website verifying the second token, logging into the second website without a password;
  displaying a logged-in page of the second website in an embedded page associated with the first website; and
  displaying, on a same page as the embedded page associated with the first website based on the website identifiers associated with the first tokens, at least one other second website that has enabled the password-free proxy login through the first website.

14. The computer-implemented system of claim 13, the operations further comprising, prior to identifying the website jump trigger indication:
  receiving, by the first website, a password-free proxy login setting request sent by the second website, wherein the password-free proxy login setting request comprises the second token;
  creating, by the first website, the first token comprising the device fingerprint;
  storing the first token in the cookie store of the web browser;
  storing a correspondence between the first token and the second token; and
  notifying the second website that password-free proxy login is successfully set.

15. The computer-implemented system of claim 14, the operations further comprising:
  storing the second token in a backend database separate from the cookie store of the web browser, wherein obtaining the second token comprises obtaining the second token from the backend database.

16. The computer-implemented system of claim 13, the operations further comprising, in response to a user selection associated with a third website:
  sending, using the web browser, a second password-free login request to the third website, the second password-free login request comprising a fourth token corresponding to the website identifier of the third website, wherein the fourth token includes a second token corresponding to the third website.

17. The computer-implemented system of claim 16, wherein, when the cookie store stores the plurality of first tokens that separately correspond to different second websites, the operations further comprise:
  when identifying, using the web browser presenting the first website, the website jump trigger indication, selecting one of the second website or the third website, based on a predetermined selection rule, to perform password-free proxy login.

18. The computer-implemented system of claim 13, the operations further comprising:
  receiving a password-free proxy login cancellation request sent by the second website, wherein the password-free proxy login cancellation request comprises a fourth token, wherein the fourth token is an indication created by the second website for canceling password-free proxy login, and wherein the third token comprises the website identifier of the second website;
  obtaining, based on the website identifier in the fourth token, the first token corresponding to the second website; and
  deleting the first token and the second token that corresponds to the first token.

* * * * *